US012688119B2

(12) United States Patent
Wu et al.

(10) Patent No.: US 12,688,119 B2
(45) Date of Patent: Jul. 21, 2026

(54) MEMORY SYSTEM WITH DYNAMICALLY ENUMERATED IDENTIFIERS

(71) Applicant: MACRONIX INTERNATIONAL CO., LTD., Hsinchu (TW)

(72) Inventors: Sheng-Lun Wu, Toufen City (TW); Chun-Lien Su, Taichung City (TW)

(73) Assignee: MACONIX INTERNATIONAL CO., LTD., Hsinchu (TW)

( * ) Notice: Subject to any disclaimer, the term of this patent is extended or adjusted under 35 U.S.C. 154(b) by 268 days.

(21) Appl. No.: 18/583,942

(22) Filed: Feb. 22, 2024

(65) Prior Publication Data

US 2025/0272229 A1 Aug. 28, 2025

(51) Int. Cl.
*G06F 12/02* (2006.01)
*G06F 1/10* (2006.01)

(52) U.S. Cl.
CPC ............ *G06F 12/0246* (2013.01); *G06F 1/10* (2013.01)

(58) Field of Classification Search
CPC .............................. G06F 12/0246; G06F 1/10
See application file for complete search history.

(56) References Cited

U.S. PATENT DOCUMENTS

| | | | | |
|---|---|---|---|---|
| 5,150,328 A | * | 9/1992 | Aichelmann, Jr. .... | G11C 5/066 365/189.03 |
| 2008/0025129 A1 | * | 1/2008 | Bartley ................... | G11C 5/00 365/230.06 |
| 2012/0109896 A1 | * | 5/2012 | Abraham ............ | G06F 13/1694 707/E17.007 |
| 2015/0378814 A1 | * | 12/2015 | Webb ..................... | G06F 3/061 714/768 |

* cited by examiner

*Primary Examiner* — Larry T Mackall
(74) *Attorney, Agent, or Firm* — McClure, Qualey & Rodack, LLP

(57) ABSTRACT

A memory system with high capacity and high performance, having memory units with a type of 3D NOR flash or 3D NAND flash. The memory system comprises a plurality of logic units connected with one another in series to form a chain. Each of the logic units is a logic unit number (LUN) device having an identifier "LUN ID", and comprises a control circuit. The control circuit communicates with a host controller through a common interface utilizing an ONFI bus and a sideband bus, and the control circuit of a corresponding logic unit may communicate with a control circuit of an adjacent logic unit through the sideband bus. The control circuits of the logic units cooperate with a host controller to perform an enumeration for the identifier "LUN ID" of each of the logic units.

25 Claims, 23 Drawing Sheets

"0x74"
Enumeration Command

MEMORY SYSTEM WITH DYNAMICALLY ENUMERATED IDENTIFIERS

TECHNICAL FIELD

The disclosure relates to a semiconductor memory, and more particularly, relates to a memory system with a capability of dynamically enumerating identifiers.

BACKGROUND

For a memory system, when multiple logic units are integrated in a single package, logic unit number (LUN) addressing mechanism is provided to identify these logic units. Each of the logic units has addressing pads (i.e., LUN addressing pads) used to determine an identifier "LUN ID".

The LUN addressing pads, which include "pad LUN1" and "pad LUN0", are tied to the supply voltage (i.e., VCC) or the ground voltage (i.e., GND) to define the identifier "LUN ID" of the logic unit. Furthermore, a host controller, which is disposed in the host side, may designate a selected logic unit utilizing "bit LUN1" and "bit LUN0" in a fifth address cycle, when address allocation is performed.

However, as the memory system include a large number of stacked logic units, many LUN addressing pads and bounding wires are needed, which may result in complex masking in fabrication process and lead to a high cost of the memory system.

To address the above issue, it is desirable to have an improved configuration for memory system, which may dynamically enumerate identifier "LUN ID" for each logic unit.

SUMMARY

According to an aspect of the disclosure, a memory system is provided. The memory system has high capacity and high performance, which includes a memory unit having a type of NOR or NAND flash (e.g., 3D NAND flash). The memory system comprises a plurality of logic units connected with one another in series to form a chain. Each of the logic units has an identifier, an input data port and an output data port. Each of the logic units comprises a control circuit, which used to control a corresponding one of the logic units to receive a first data signal through the input data port or generate the first data signal internally, and transmit a second data signal through the output data port, and the output data port of the corresponding one of the logic units is coupled to the input data port of an adjacent one of the logic units. Each of the first data signal and the second data signal has a sequence of states, and the identifier of each of the logic units is enumerated according to a count number of a plurality of state transition edges of the states.

According to another aspect of the disclosure, a memory system is provided. The memory system comprises a plurality of logic units connected with one another in series to form a chain. Each of the logic units has an identifier, an input data port, an output data port and a clock port. Each of the logic units comprises a control circuit, used to control a corresponding one of the logic units to receive a first data signal through the input data port or generate the first data signal internally, transmit a second data signal through the output data port, and receive a clock signal having a sequence of edges through the clock port, and the output data port of the corresponding one of the logic units is coupled to the input data port of an adjacent one of the logic units. The corresponding one of the logic units transmits the second data signal carrying a first command having a start bit, and the adjacent one of the logic units receives the second data signal and latches the start bit of the first command according to the edges of the clock signal, and the identifier of each of the logic units is enumerated according to the start bit of the first command.

According to still another aspect of the disclosure, a memory system is provided. The memory system comprises a plurality of logic units and a host controller. The logic units are connected with one another in series to form a chain. Each of the logic units has an identifier, a clock port, a plurality of input data ports and a plurality of output data ports, The output data ports of the corresponding one of the logic units are coupled to the input data ports of an adjacent one of the logic units. The host controller is coupled to the input data ports of the first logic unit of the logic units, and coupled to the output data ports of the last logic unit.

BRIEF DESCRIPTION OF THE DRAWINGS

FIG. 3C-1 and 3C-2 are block diagrams of still other embodiments of the memory system.

FIG. 3D-1 and 3D-2 are block diagrams of yet other embodiments of the memory system.

Figure 1A:
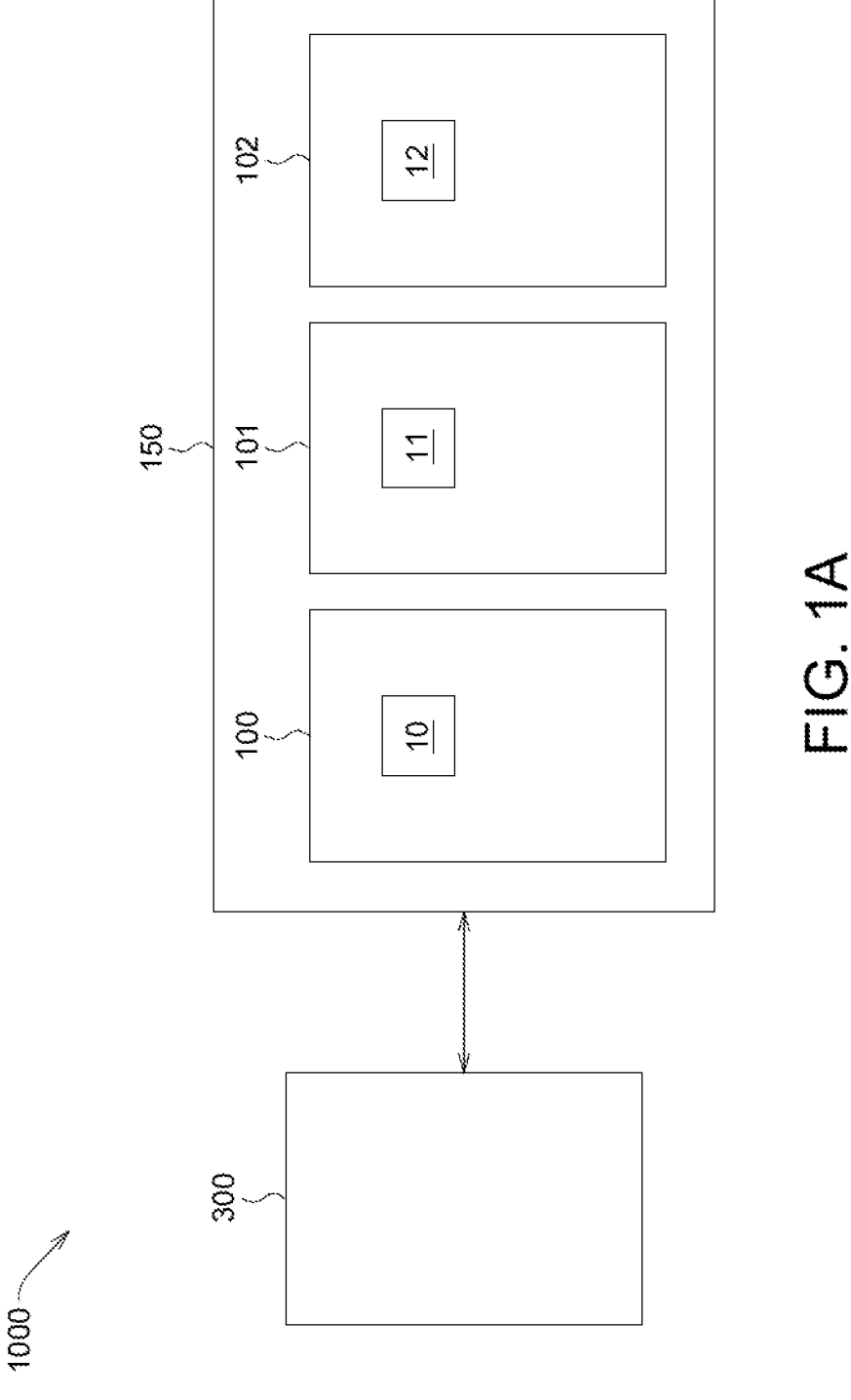
FIG. 1A is a block diagram of a memory system according to an example of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing.

DETAILED DESCRIPTION

FIG. 1A is a block diagram of a memory system 1000 according to an example of the disclosure. The memory system 1000 has high capacity and high performance. Referring to FIG. 1A, the memory system 1000 includes a host controller 300 and a memory unit 150. The host controller 300 may be disposed in the host side, and the host side is, e.g., a central processing unit (CPU) or a micro control unit (MCU). The memory unit 150 includes multiple logic units with a total number of N. In the example of FIG. 1A, the total number N is, e.g., "3", which refer to three logic units 100, 101 and 102. The memory unit 150 may have a type of NOR flash or NAND flash. The memory unit 150 may be a three-dimensional (3D) NOR flash memory unit or a 3D NAND flash memory unit.

Each of the logic units 100-102 is a logic unit number (LUN) device, which may include a memory chip or a memory die. Furthermore, each of the logic units 100-102 may include memory arrays with memory blocks therein. The logic units 100-102 are integrated in a package, which is referred to as "multi-chip package (MCP)". Each of logic units 100-102 has an identifier "logic unit number identity (LUN ID)". The identifier "LUN ID" is used to provide LUN addressing for identifying the logic units 100-102. The identifier "LUN ID" of each of the logic units 100-102 is stored in a register, and the identifier "LUN ID" has a registered value.

Furthermore, each of the logic units 100-102 further includes a control circuit, which serves as a device controller. For example, the logic unit 100 includes a control circuit 10, the logic unit 101 includes a control circuit 11, and the logic unit 102 includes a control circuit 12. The control circuits 10, 11 and 12 are used to control operations of the logic units 100-102 respectively. The control circuits 10, 11 and 12 may communicate with the host controller 300 through a common interface utilizing an open-NAND-flash-interface (ONFI) bus and a sideband bus, and the control circuits 10, 11 and 12 may communicate with one another through the a sideband bus. The control circuits 10, 11 and 12 cooperate with the host controller 300 to perform an enumeration procedure for the identifier "LUN ID" of each of the logic units 100-102. In the enumeration procedure, the identifiers "LUN ID" the logic units 100-102 are enumerated to determine the final values of the identifiers "LUN ID". Such as, the "LUN ID" of the logic unit 100 is enumerated to have a final value "0". Likewise, the "LUN IDs" of the logic units 101 and 102 are enumerated to have final values "1" and "2".

Figure 1B:
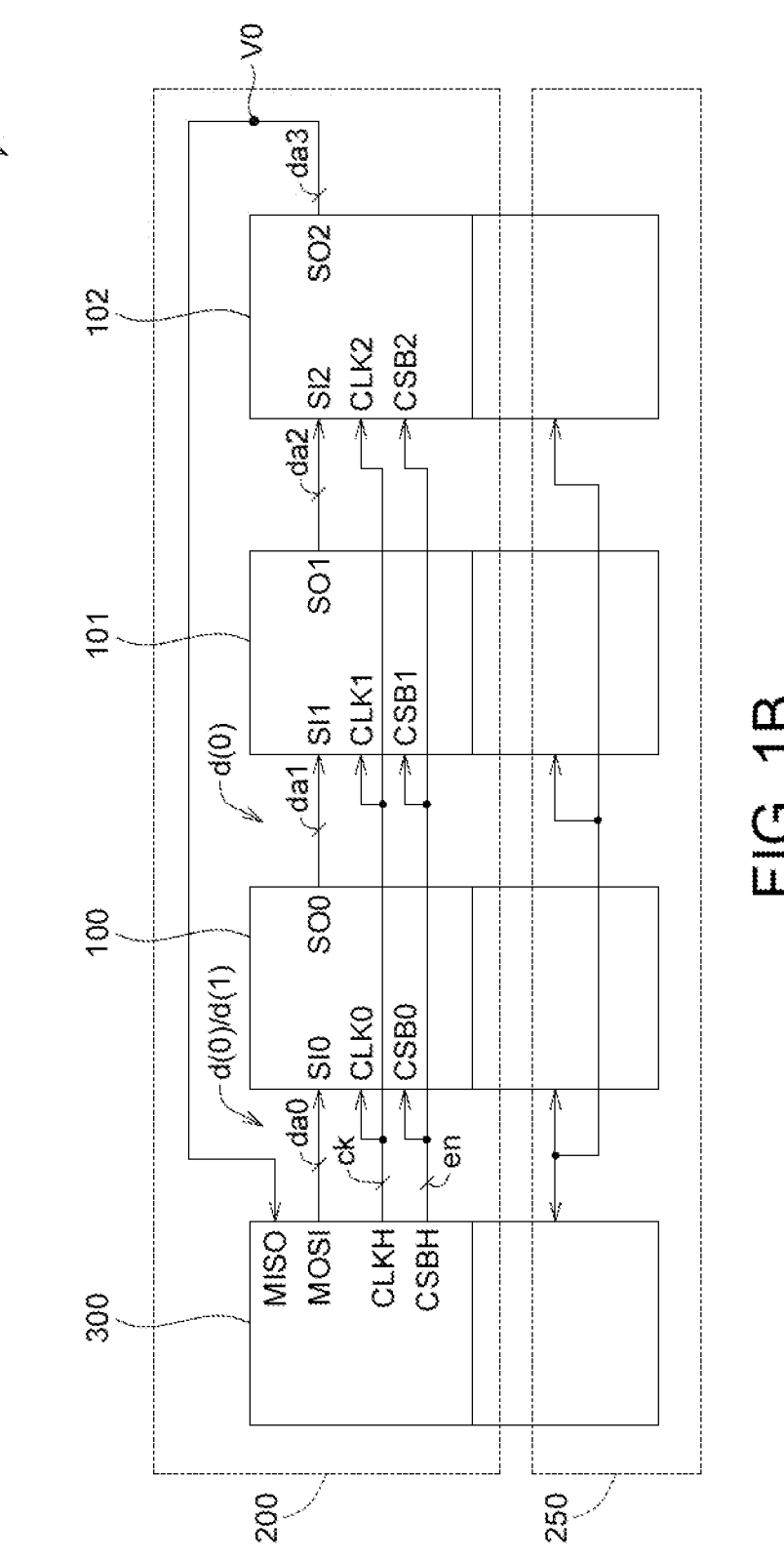
FIG. 1B illustrates the memory system of FIG. 1A performing operations with a sideband bus and an ONFI (Open NAND Flash Interface) bus.

FIG. 1B illustrates the memory system 1000 of FIG. 1A performing operations with an ONFI bus 250 and a sideband bus 200. Referring to FIG. 1B, the ONFI bus 250 serves as a main memory bus for normal operations of the logic units 100-102. On the other hand, the sideband bus 200 serves to perform enumeration for the identifiers "LUN ID" of the logic units 100-102. The sideband bus 200 may be executed with a protocol conformed to the Universal Asynchronous Receiver/Transmitter (UART) or the Universal Serial Bus (USB). The sideband bus 200 utilizes an input data port, an output data port, a clock port and an enable port, and the logic units 100-102 are connected with one another in series to form a chain. In one example, the chain has a type of Daisy Chain. The logic unit 100 has an input data port SI0, an output data port SO0, a clock port CLK0 and an enable port CSB0. Likewise, the logic unit 101 has an input data port SI1, an output data port SO1, a clock port CLK1 and an enable port CSB1. The logic unit 102 has an input data port SI2, an output data port SO2, a clock port CLK2 and an enable port CSB2. Correspondingly, the host controller 300 has an input data port MISO, an output data port MOSI, a clock port CLKH and an enable port CSBH.

In the serial connection forming a chain, the output data port SO(i) of the i-th logic unit of a current stage is coupled to the input data port SI(i+1) of the (i+1)-th logic unit of a next stage. In the example of FIG. 1B, the output data port SO0 of the logic unit 100 of a first stage is coupled to the input data port SI1 of the logic unit 101 of a second stage. The output data port SO1 of the logic unit 101 of the second stage is coupled to the input data port SI2 of the logic unit 102 of a last stage. Furthermore, the input data port SI0 of the logic unit 100 of the first stage is coupled to the output data port MOSI of the host controller 300. Moreover, the output data port SO2 of the logic unit 102 is coupled to the input data port MISO of the host controller 300. In other words, the logic units 100-102 are connected with one another in series to form the chain, where the logic unit 102 is the last stage of the chain. In the example of FIG. 1B, the output data port SO2 of the logic unit 102 (i.e., the last stage) is looped back to the input data port MISO of the host controller 300, and the chain has a form of the Daisy Chain.

The host controller 300 provides a data signal da0 through output data port MOSI, and data signal da0 is then received by logic unit 100 through input data port SI0. When the control circuit 10 (not shown in FIG. 1B) controls the logic unit 100 to operate in a non-blocking mode, control circuit 10 controls the data signal da0 to directly pass to the output data port SO0, forming the data signal da1 (i.e., data signal da1 is identical with data signal da0). When the control circuit 10 controls the logic unit 100 to operate in a blocking mode, control circuit 10 controls the data signal da0 to be delayed by a period, and then pass to the output data port SO0 (i.e., data signal da1 is a delayed-version of data signal da0). In addition, control circuit 10 may control to generate data signal da1 regardless data signal da0 (i.e., data signal da1 is not related to data signal da0). With respect to the logic unit 100 of current stage, the data signal da0 is referred as the "first data signal", and the data signal da1 is referred as the "second data signal". That is, the logic unit 100 receives the "first data signal" through the input data port SI0 and transmits the "second data signal" through the output data port SO0.

Data signal da1 is received by logic unit 101 through input data port SI1 and then provided to output data port SO1, forming data signal da2. Then, data signal da2 is received by logic unit 102 through input data port SI2 and then provided to output data port SO2, forming data signal da3. Thereafter, data signal da3 is sent back to host controller 300 through input data port MISO.

The host controller 300 may analyze the data signal da3 provided by the output data port SO2 of the logic unit 102, and the host controller 300 may know the connecting manner of the logic units 100-102. In one example, the output data port SO2 of the logic unit 102 may transmit the data signal da3 with a voltage V0 (e.g., the voltage V0 has a high voltage level of 1.5V, 3V or 5V, etc.) to indicate the host controller 300 that, the logic unit 102 is the last stage of the chain.

Figure 1C:
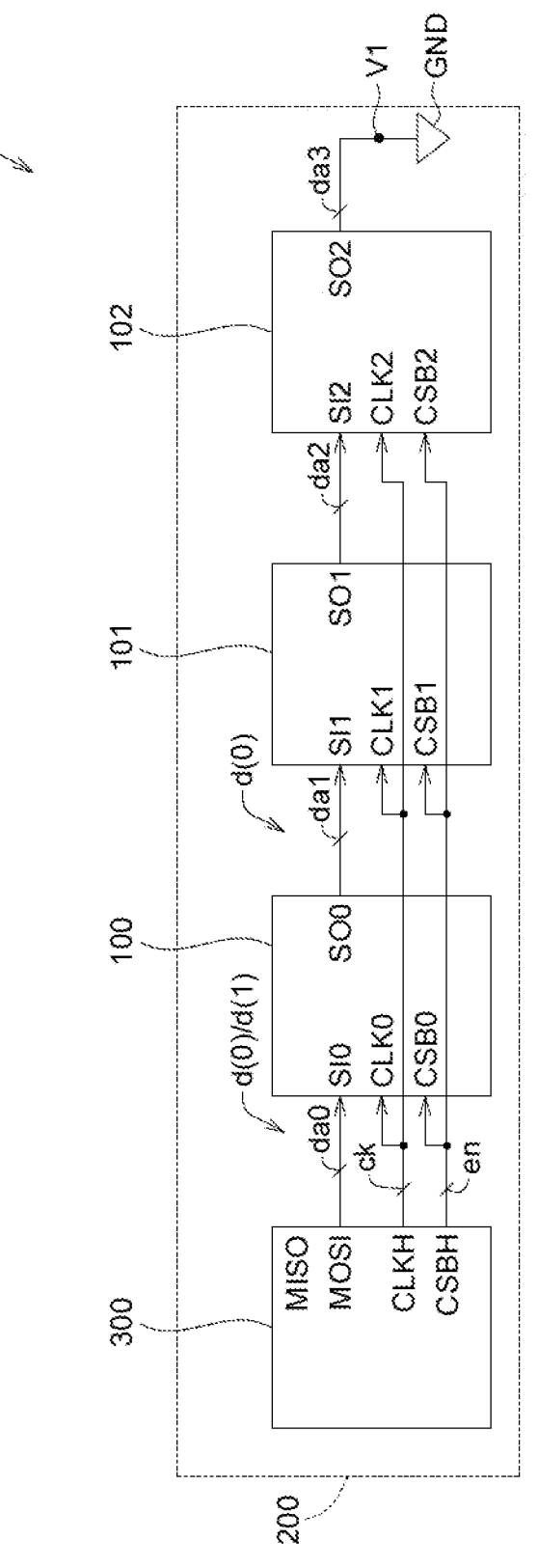
FIG. 1C is a block diagram of another embodiment of the memory system.
Figure 1D:
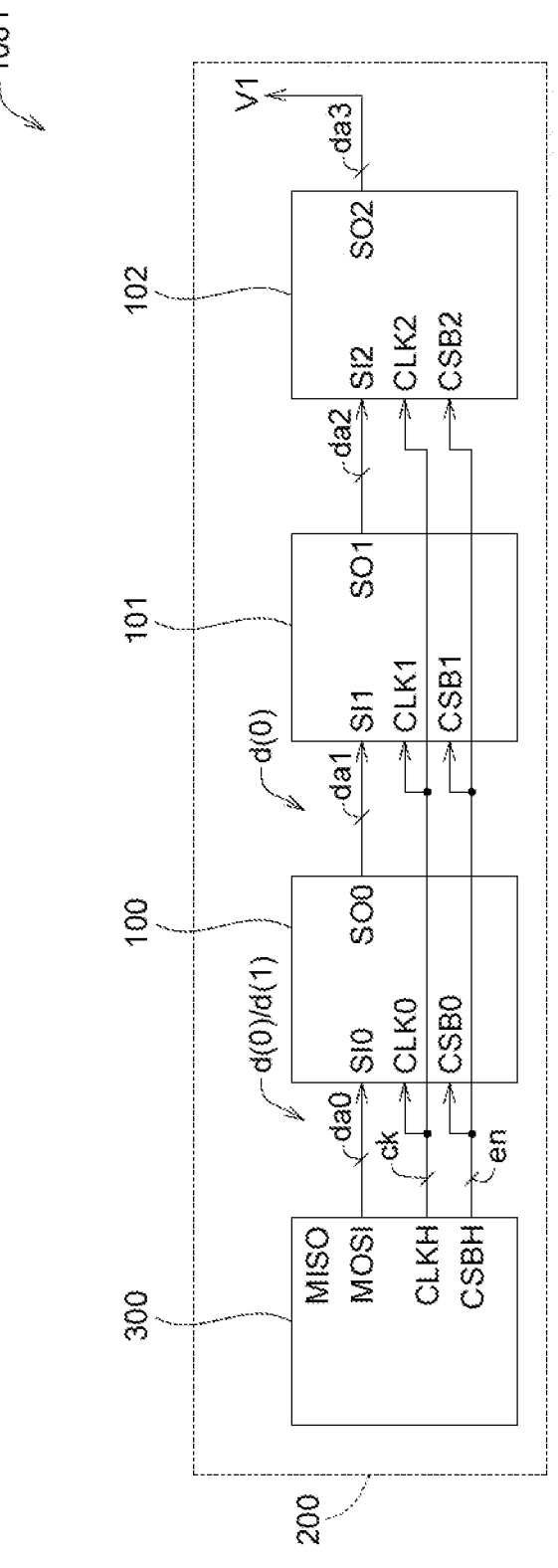
FIG. 1D is a block diagram of another example of the memory system of FIG. 1C.

Alternatively, referring to FIG. 1C which illustrates another embodiment of the memory system 1001 (in FIG. 1C, only the sideband bus 200 is shown, and the ONFI bus 250 is omitted), the output data port SO2 of the logic unit 102 may not be looped back to the host controller 300. Instead, the output data port SO2 of the logic unit 102 is tied to a voltage V1 to indicate that the logic unit 102 is the last stage of the chain. In the embodiment of FIG. 1C, the output data port SO2 of the logic unit 102 is tied to a ground end GND, hence the voltage V1 for the output data port SO2 is a ground voltage (e.g, 0V). In another embodiment shown in FIG. 1D, the output data port SO2 of the logic unit 102 is tied to a voltage V1 with a high voltage level of 1.2V, 1.8V or 3V, etc.

Referring to FIG. 1B again, a clock signal ck is generated by the host controller 300 through the clock port CLKH, and then provided to the logic units 100-102 through their respective clock ports CLK0-CLK2. A content d(0) is carried by data signal da0, and control circuit 10 controls logic unit 100 to latch data signal da0 to acquire content d(0) according to rising edges of the clock signal ck. Then, control circuit 10 controls logic unit 100 to transmit data signal da1 with content d(0) according to falling edges of the clock signal ck. Similarly, at a rising edge of a next clock cycle of clock signal ck, control circuit 10 controls to latch data signal da0 to acquire a next content d(1). Then, the content d(1) will be carried by data signal da0 and transmitted through output data port SO0 at a falling edge of the clock signal ck. In this manner, contents d(0), d(1), . . . etc. may be sequentially provided to logic units 100-102. In one example, contents d(0), d(1), . . . etc. may be a sequence of state(s). In another example, contents d(0), d(1), . . . etc. may be a series of data, such as commands of SPI (Serial Peripheral Interface) protocol.

In addition, enable signal en may be generated by the host controller 300 through the enable port CSBH, and then be provided to the logic units 100-102 through their respective enable ports CSB0-CSB2. These enable ports CSB0-CSB2 are low-active. Initially, the enable signal en has a high voltage level (e.g., 1.2V, 1.8V or 3V), and the enable ports CSB0-CSB2 are de-asserted and the logic units 100-102 are de-activated. When the enable signal en changes to a low voltage level (e.g., 0V), the enable ports CSB0-CSB2 are asserted and the logic units 100-102 are activated to operate with the sideband bus 200. After the sideband bus 200 is activated, an enumerating procedure for the identifier "LUN ID" of logic units 100-102 may start to perform.

Figure 2:
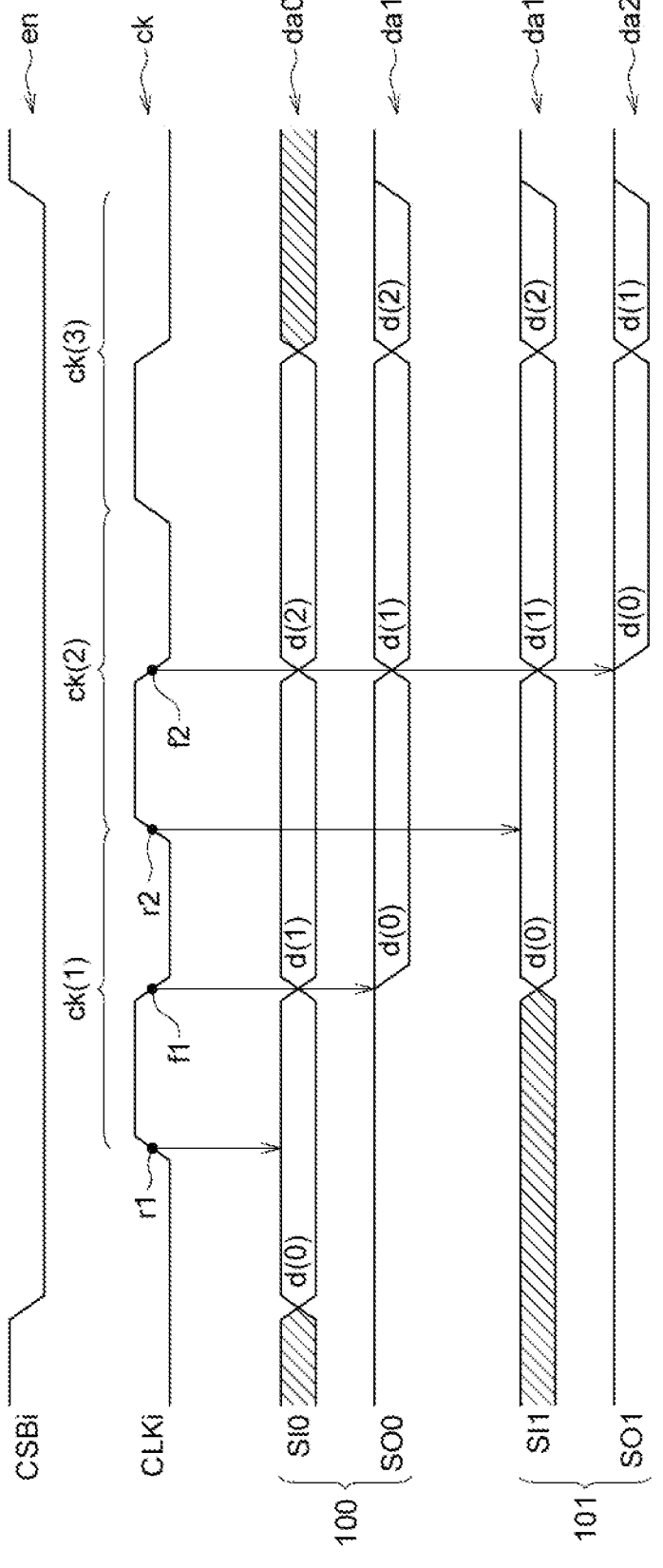
FIG. 2 is an exemplary waveform diagram of the data signals, the enable signal and the clock signal of logic units of FIG. 1B.

FIG. 2 is an exemplary waveform diagram of the data signals da0-da2, the enable signal en and the clock signal ck of logic units 100 and 101 of FIG. 1B, illustrating the transmission of data signals da0-da2. Referring to FIG. 2, initially the enable signal en has the high voltage level, and enable port CSB0 and CSB1 of logic unit 100 and 101 are de-asserted and logic units 100 and 101 are not activated. Input data ports SI0 and SI1 of logic unit 100 and 101 are not driven and have high impedance, and output data ports SO0 and SO1 each have a high voltage level.

When enable signal en changes to the low voltage level, enable port CSB0 and CSB1 of logic unit 100 and 101 are asserted and logic units 100 and 101 are activated. Input data ports SI0 is provided with data signal da0 which carries a content d(0). At a rising edge r1 of clock cycle ck(1) of clock signal ck, control circuit 10 of logic unit 100 controls to latch data signal da0 to acquire content d(0). Then, at a falling edge f1 of the same clock cycle ck(1), control circuit 10 controls to drive output data port SO0 to transmit data signal da1 such that data signal da1 carries content d(0).

The data signal da1 is provided to input data port SI1 of logic unit 101, and control circuit 11 of logic unit 101 controls to latch data signal da1 to acquire content d(0) at rising edge r2 of a next clock cycle ck(2). Then, at a falling edge f2 of clock cycle ck(2), control circuit 11 controls to drive output data port SO1 to transmit data signal da2 which carries content d(0).

On the other hand, at rising edge r2 of clock cycle ck(2), data signal da0 is latched at input data port SI0 to acquire a next content d(1). Then, at falling edge f2 of clock cycle ck(2), data signal da1 is driven at output data port SO0 to carry content d(1).

After sideband bus 200 operates for several clock cycles, e.g., three clock cycles ck(1), ck(2) and ck(3), if enable signal en changes to high voltage level again, enable port CSB0 and CSB1 of logic unit 100 and 101 are de-asserted again, and logic units 100 and 101 are de-activated. Output data ports SO0 and SO1 each change to high voltage level again.

Figure 3A:
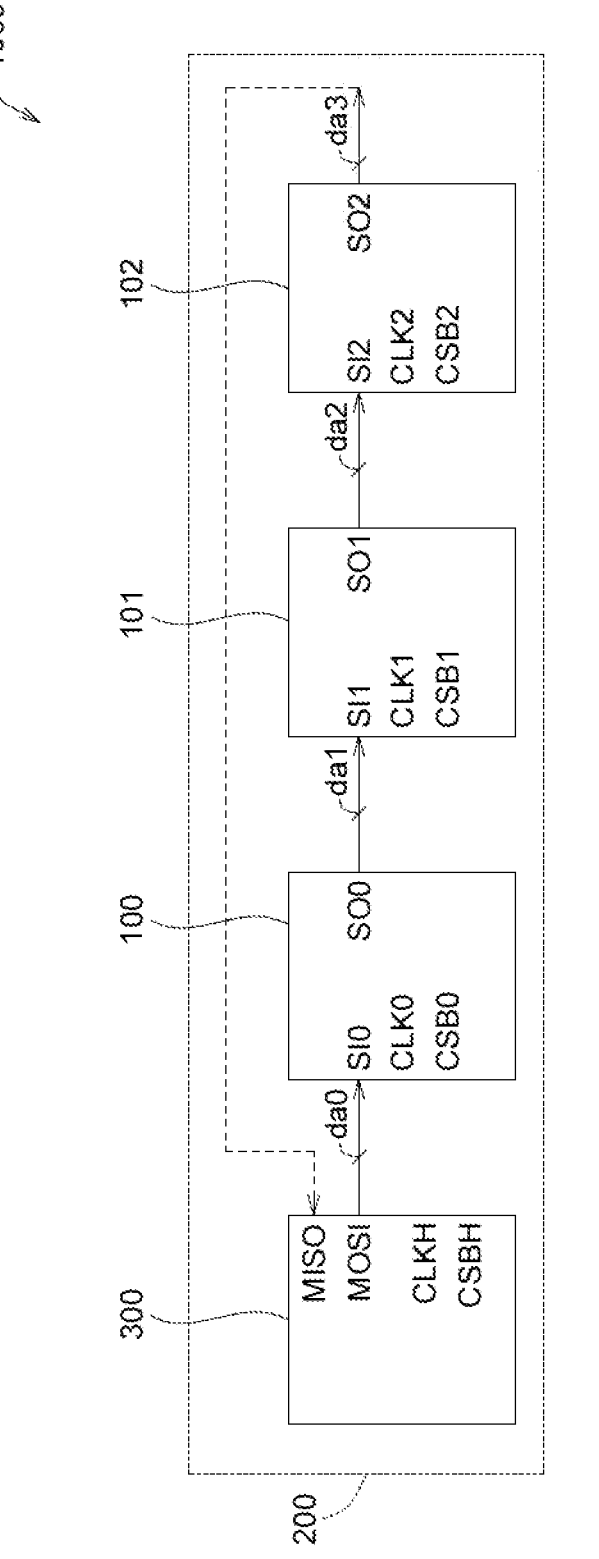
FIG. 3A is a block diagram of the memory system illustrating an exemplary enumerating procedure for the identifier "LUN ID" of the logic units.

FIG. 3A is a block diagram of the memory system 1000 illustrating an exemplary enumerating procedure for the identifier "LUN ID" of the logic units 100-102. In the exemplary enumerating procedure of FIG. 3A, the memory system 1000 may utilize input data ports SI0-SI2 and output data ports SO0-SO2 of logic units 100-102 in the sideband bus 200 to enumerate identifier "LUN ID", but not utilize the clock ports CLK0-CLK2 and the enable ports CSB0-CSB2. Furthermore, the host controller 300 may be selectively utilized for the enumerating procedure. When the host controller 300 is utilized, the output data port MOSI of the host controller 300 is coupled to the input data port SI0 of logic unit 100, and host controller 300 generates data signal da0 and provides data signal da0 to logic unit 100. The input data port MISO of host controller 300 is coupled to the output data port SO2 of logic unit 102, and host controller 300 receives data signal da3 from logic unit 102.

The control circuits 10, 11 and 12 illustrated in FIG. 1A (not shown in FIG. 3A) control the logic units 100, 101 and 102 to perform enumerating procedure for identifier "LUN ID" with sideband bus 200. In the example of FIG. 3A, control circuits 10, 11 and 12 control to transmit and receive data signals da0-da3 through input data ports SI0-SI2 and output data ports SO0-SO2 of sideband bus with SPI protocol. The identifier "LUN ID" of logic units 100, 101 and 102 are enumerated according to data signals da0-da3. In an example, final values of the enumerated identifiers "LUN ID" of logic units 100-102 may be provided to host controller 300 through data signal da3. In another example, final values of the enumerated identifiers "LUN ID" may be provided to another control circuit (not shown in FIG. 3A) in the memory system 1000, other than control circuits 10-12 respective disposed in logic units 100-102. In still another example, final values of the enumerated identifiers "LUN ID" may be provided to a register or a storage element (not shown in FIG. 3A) in the memory system 1000.

Figure 3B:
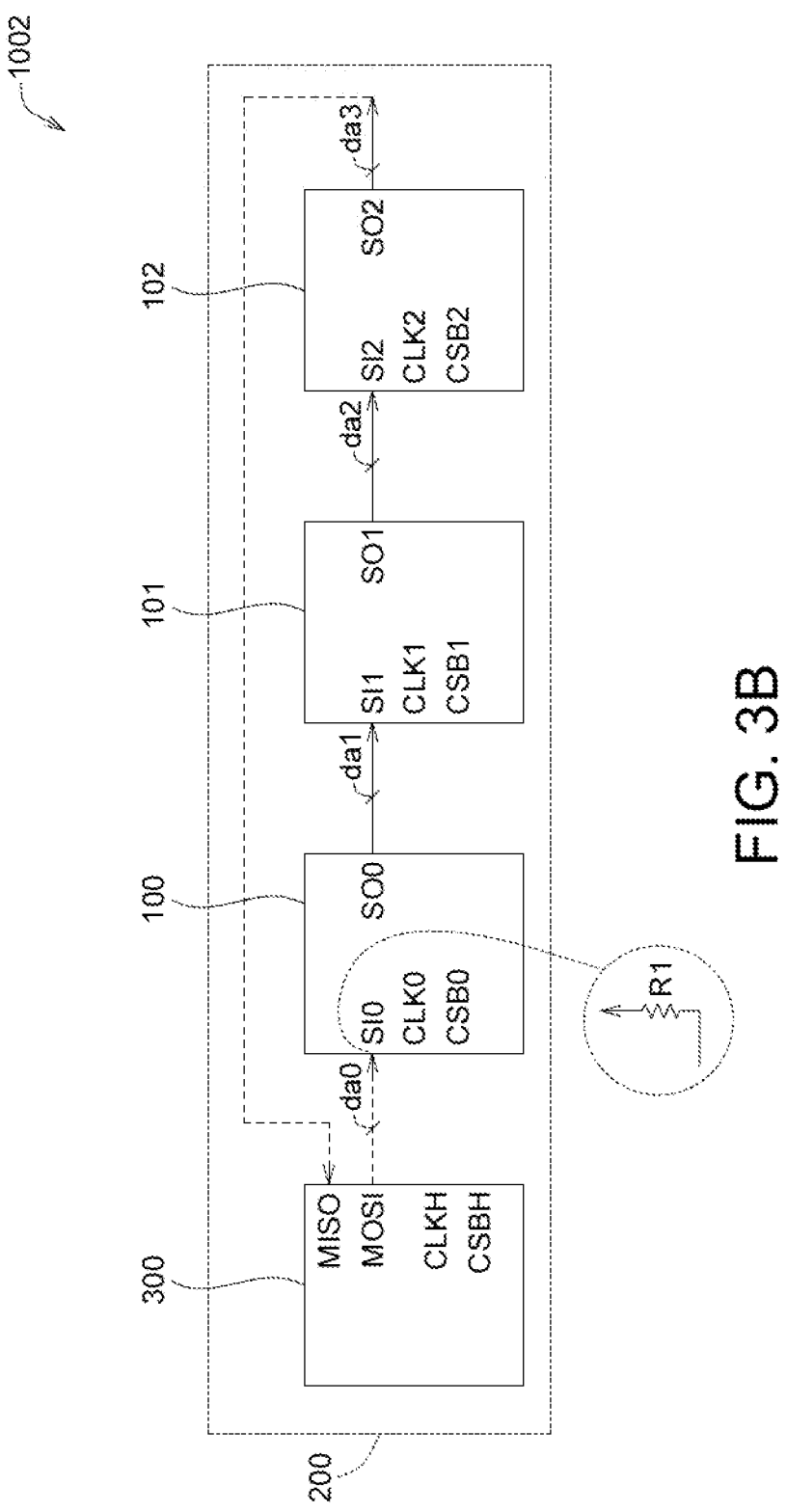
FIG. 3B is a block diagram of another embodiment of the memory system.

In another embodiment of memory system 1002 shown in FIG. 3B, the input data port SI0 of logic unit 100 may receive the data signal da0 from the host controller 300. Furthermore, the output data port SO2 of logic unit 102 is looped back to couple to the input data port MISO of host controller 300. In other examples, the logic unit 100 itself may generate the data signal da0 with an internal on-die weak connection (e.g., an internal resistor R1).

Figures 1, 3C:
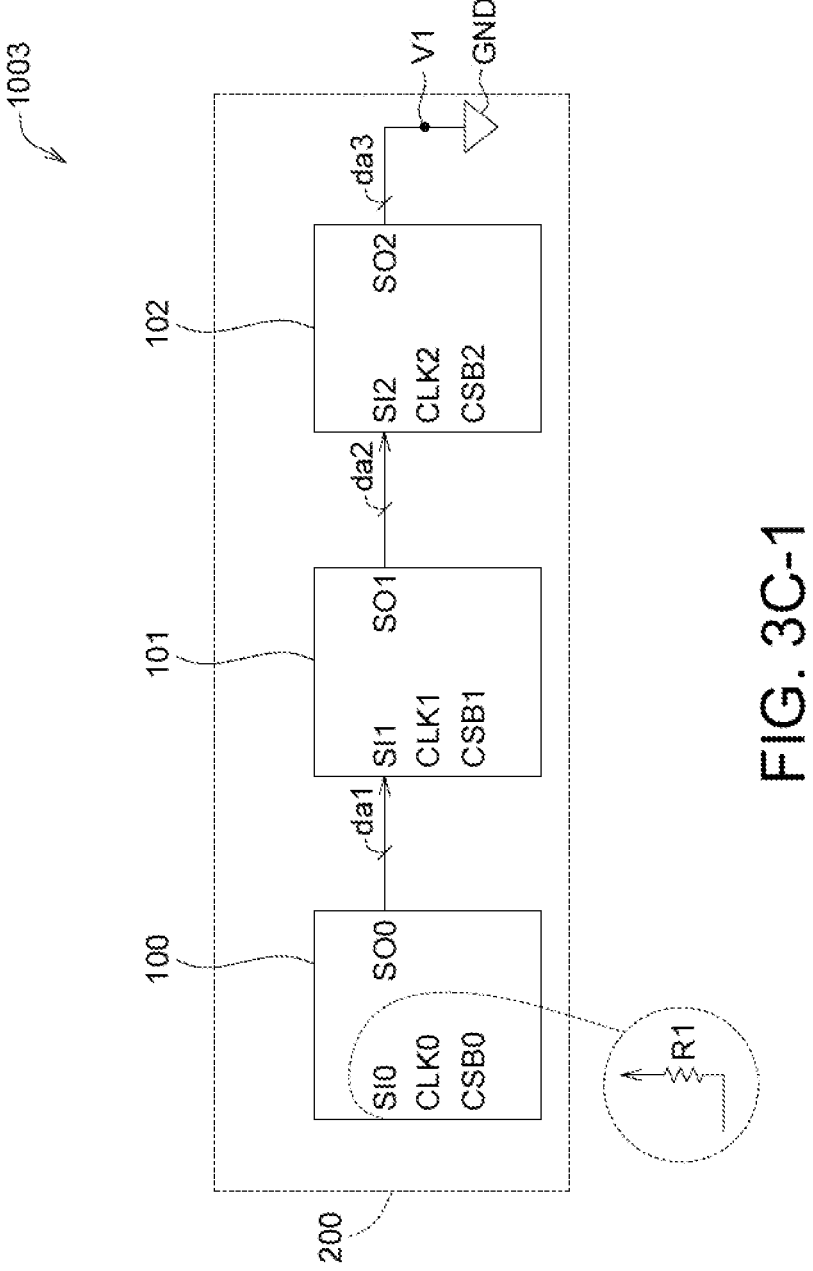
Figures 2, 3C:
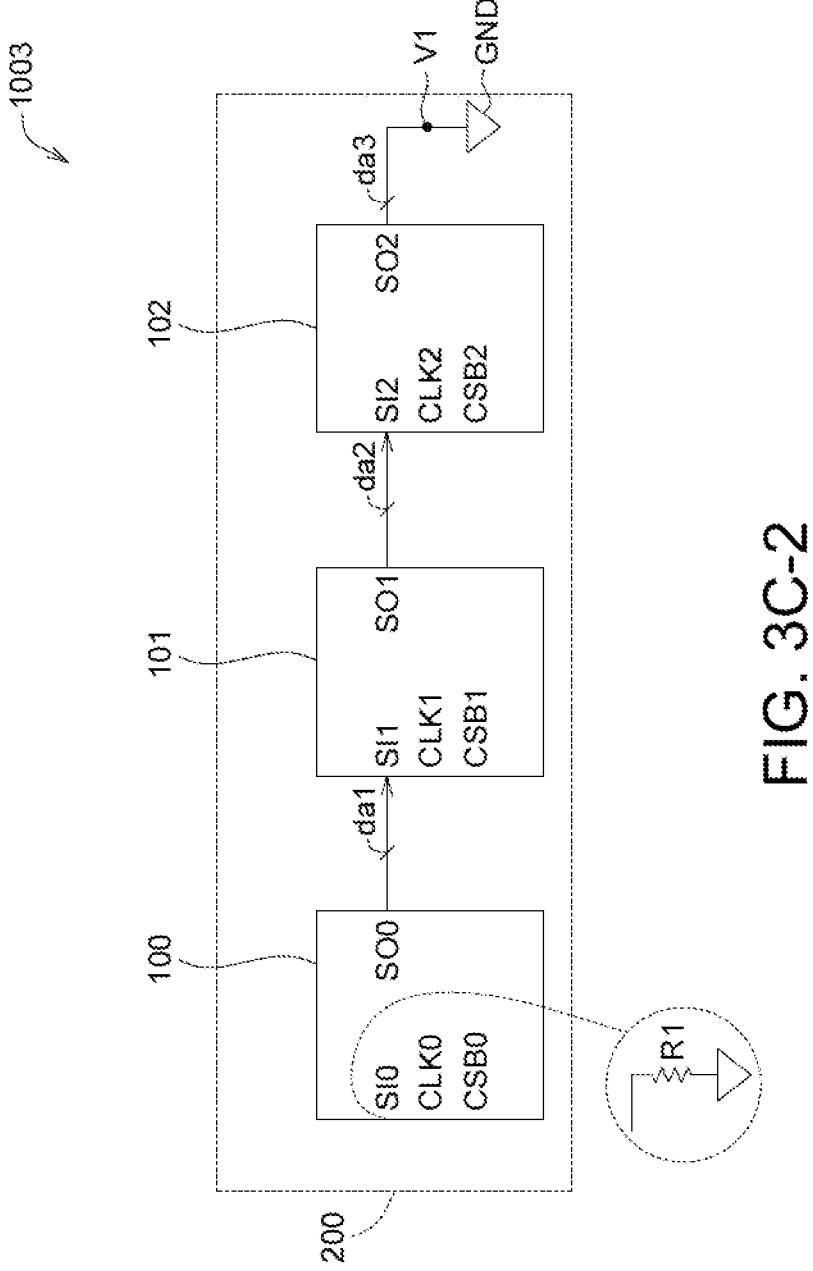

More particularly, taking the memory system 1003 of FIG. 3C-1 as an example, the resistor R1 may be a pull-up resistor which may be disposed around the input data port SI0. When the memory system 1003 is powered-ON or is reset, the resistor R1 may generate the data signal da0 with a high voltage level and results in a rising edge r1 of the data signal da0). Alternatively, in another example shown in FIG. 3C-2, the resistor R1 may be a pull-down resistor which generates a data signal da0 with a low voltage level (e.g., ground voltage).

Figures 1, 3D:
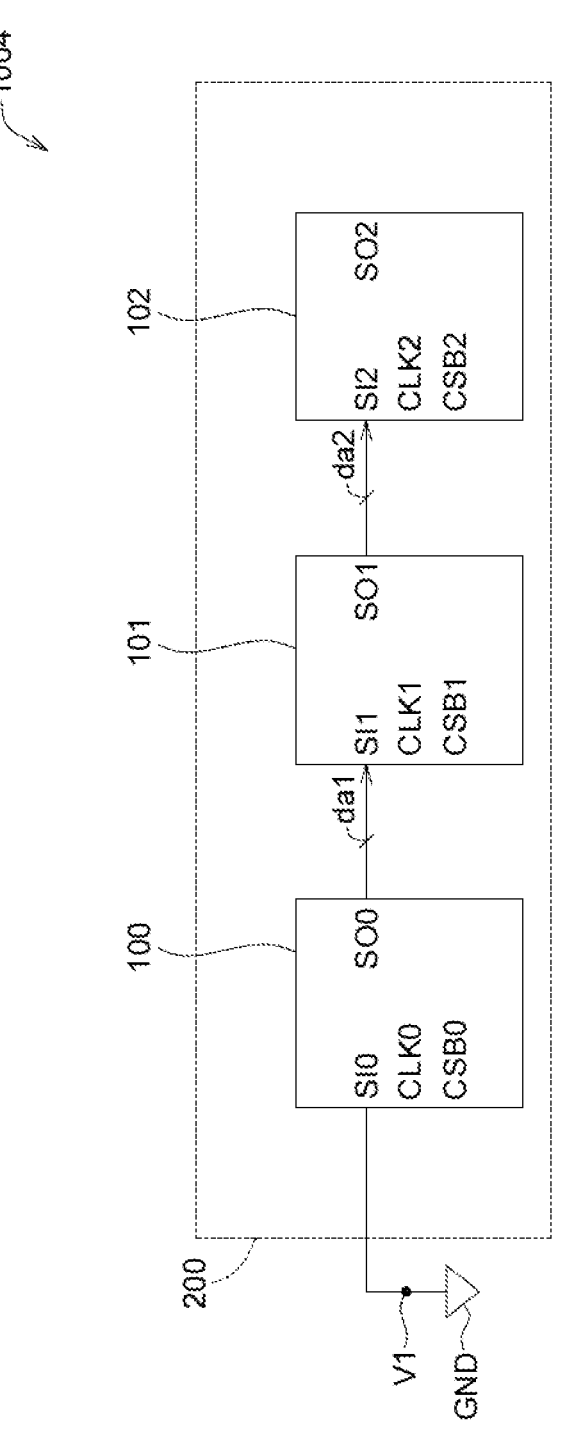
Figures 2, 3D:
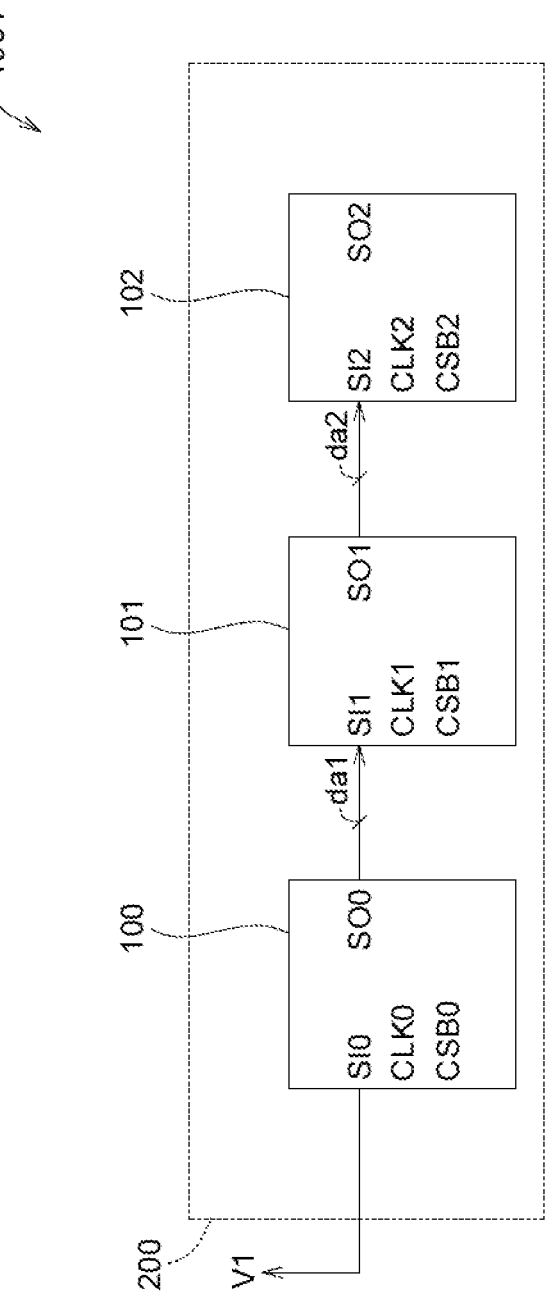

In yet another embodiment of memory system 1004 shown in FIG. 3D-1, the input data port SI0 of the logic unit 100 may be externally tied to a voltage V1 with a ground voltage, indicating that the logic unit 100 is the first stage of the chain. Alternatively, in another example of FIG. 3D-2, the input data port SI0 of the logic unit 100 may be externally tied to a voltage V1 with a high voltage level (e.g., 1.2V, 1.8V or 3V, etc.).

Figure 3E:
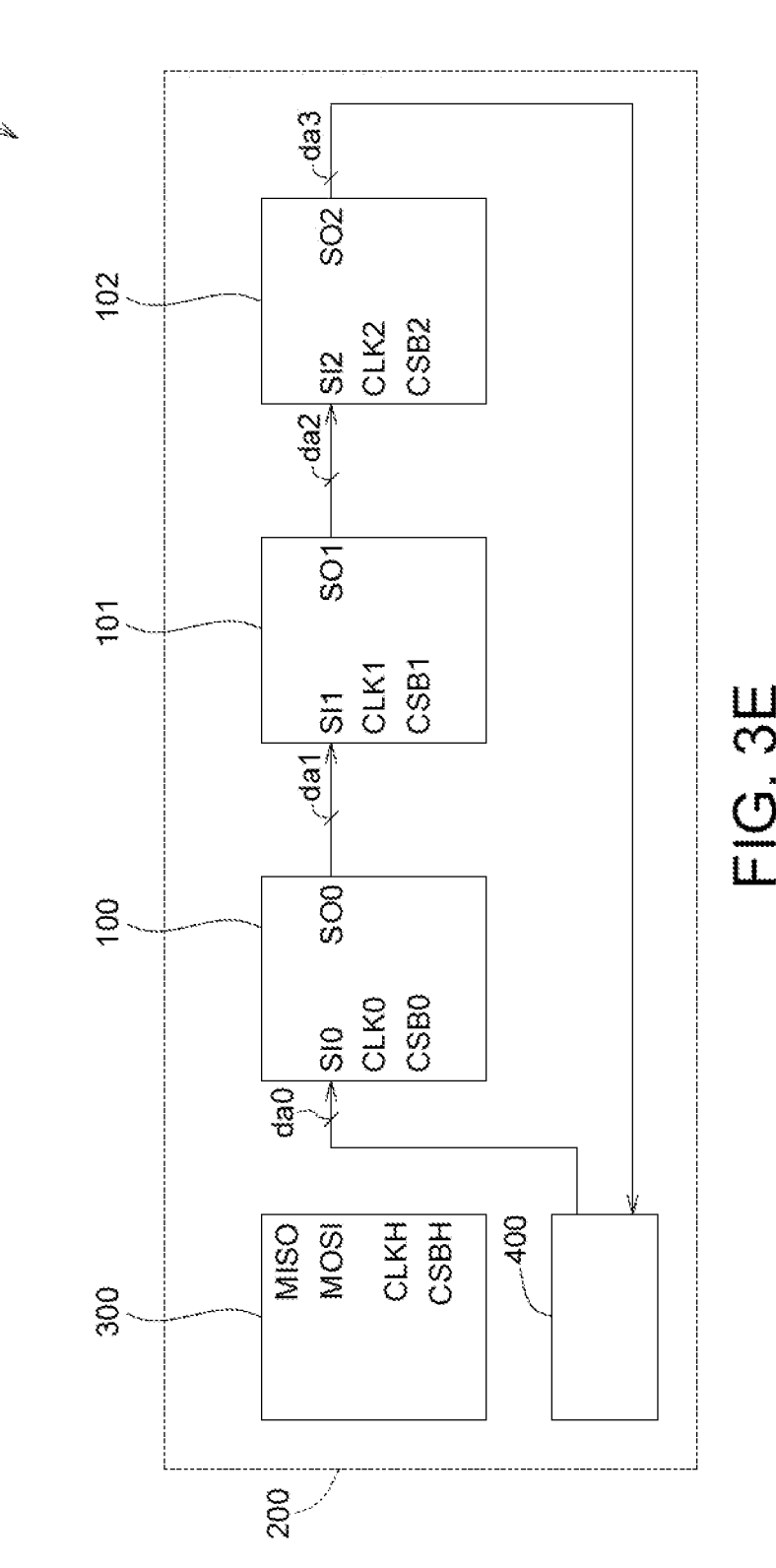
FIG. 3E is a block diagram of further another embodiment of the memory system.

In further another embodiment of memory system 1005 shown in FIG. 3E, the memory system 1005 may further include an aux controller 400 other than the host controller 300, and the logic units 100-102 may cooperate with the aux controller 400. The aux controller 400 is, e.g., a buffer chip, which serves to share the work load of the host controller 300. The input data port SI0 of the logic unit 100 (i.e., the first stage of the chain) may be coupled to the aux controller 400, and data signal da0 may be generated by the aux controller 400 (instead of the host controller 300). Furthermore, the output data port SO2 of the logic unit 102 (i.e., the last stage of the chain) may be coupled to the aux controller 400 to convey the data signal, and aux controller 400 may be configured to determine the total number of the logic units 100-102 according to the data signal da3. The host controller 300 access the logic units 100-102 through the aux controller 400 with the regular ONFI bus along or in tandem with the help of the sideband bus.

Figure 4:
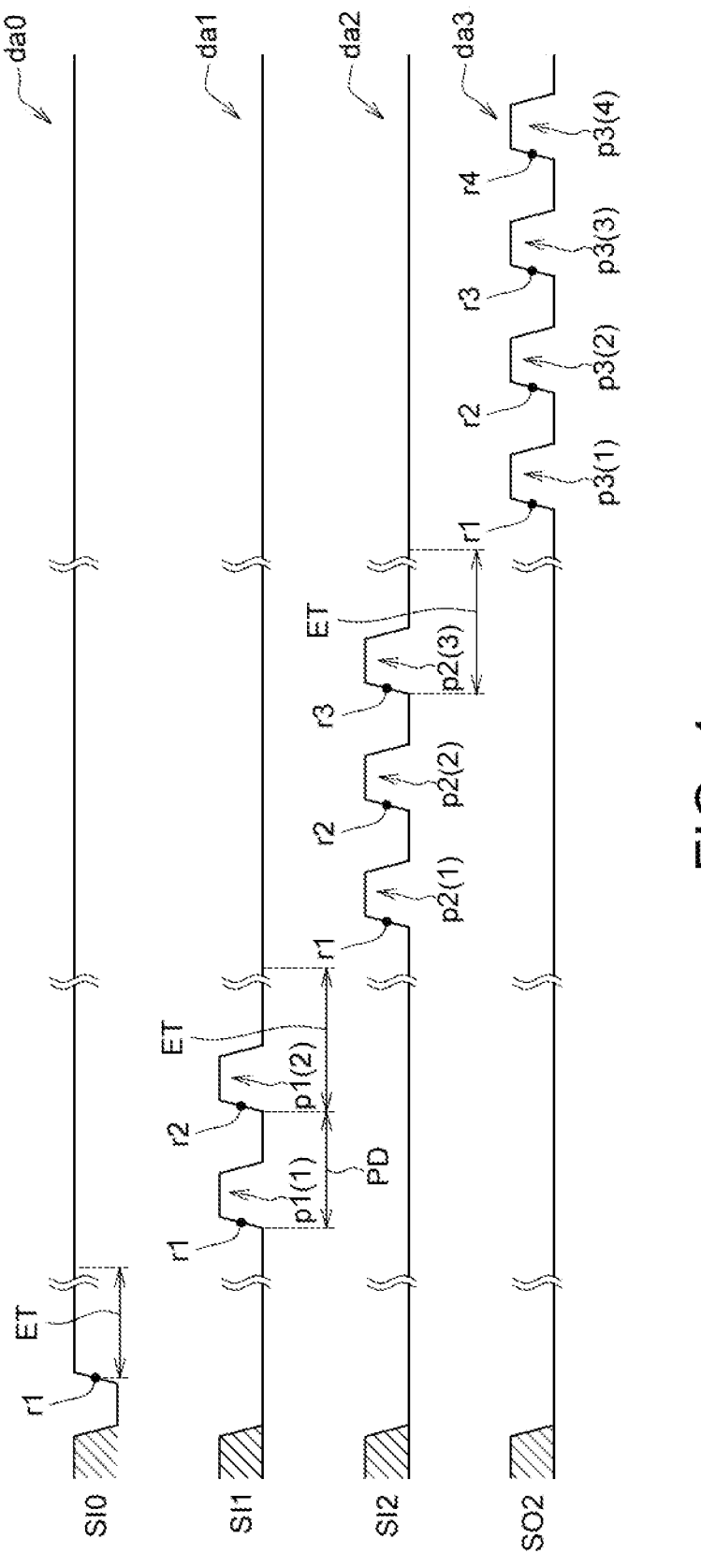
FIG. 4 is an exemplary waveform diagram of the data signals of logic units of FIG. 3A.

FIG. 4 is an exemplary waveform diagram of the data signals da0-da3 of logic units 100-102 of FIG. 3A, illustrating the enumerating procedure for the identifiers "LUN ID" of logic units 100-102. Referring to both FIGS. 3A and 4, when memory system 1000 enters the enumerating procedure for identifier "LUN ID", the host controller 300 is configured to transmit data signal da0, and control circuits 10-12 (not shown in FIG. 3A) respectively control logic units 100-102 to transmit data signals da1-da3. The data signals da0-da3 carry predefined patterns to facilitate enumerating identifier "LUN ID". In the example of FIG. 4, data signal da0 has a "pattern of a constant level, which has a high voltage level. The host controller 300 drives the data signal da0 through the output data port MOSI, such that the data signal da0 changes from the low voltage level to the high voltage level at a rising edge r1.

Each of data signals da1-da3 has a pattern of sequence of state(s). The identifiers "LUN ID" are enumerated according to the count number of state transition edges in data signals da1-da3. The edges of the data signals da1-da3 may refer to rising edges or falling edges for various of examples. The control circuits 10-12 of the logic units 100-102 may have a detector (not shown in the figure), and the detector may be configured to detect the rising edges or falling edges of the data signals da1-da3.

Then, taking the memory system 1000 of FIG. 3A as an example, in which the data signal da0 is provided by the host controller 300. The host controller 300 pulls up the data signal da0 from low voltage level to high voltage level, then the data signal da0 keeps at a constant level. Logic unit 100 receives data signal da0 at input data port SI0, and control circuit 10 in logic unit 100 may detect a rising edge r1 of data signal da0. Rising edge r1 may be referred as a "first rising edge" of data signal da0 during the enumerating procedure. The "first rising edge" of the pulses of the data signal da0 is one of the rising edges of the pulses which is firstly detected by control circuit 10 when entering the enumerating procedure.

In response to the detection of rising edge r1, the registered value of identifier "LUN ID" of logic unit 100 obtains an initial value. The initial value is set by the control circuit 10, such as, the initial value is set as "0". Then, control circuit 10 continues to detect further rising edges of data signal da0. A first period ET starting from the rising edge r1 is defined, for example, first period ET is longer than two times of a pulse duration PD of a pulse in data signals da1-da3. When the first period ET expires and control circuit 10 does not detect any further rising edges (other than rising edge r1), the registered value of identifier "LUN ID" of logic unit 100 has a final value determined as "0".

Then, control circuit 10 controls logic unit 100 to generate data signal da1 with a sequence of pulses, and these pulses have a count number M. In the example of FIG. 4, the count number M of the pulses is equal to the final value of identifier "LUN ID" of logic unit 100 added by "2", as shown in equation (1):

$$M = \text{final value of LUN\_ID} + 2 \qquad (1)$$

The "LUN ID" of logic unit 100 has a final value determined as "0", hence the count number M is equal to "2". Therefore, control circuit 10 controls logic unit 100 to generate data signal da1 with two pulses p1(1) and p1(2). These pulses p1(1) and p1(2) are transmitted to logic unit 101 through input data port SI1.

Then, control circuit 11 in logic unit 101 is configured to detect rising edges of data signal da1. When control circuit 11 detects a rising edge r1 of data signal da1, a registered value of identifier "LUN ID" of logic unit 101 obtains an initial value (e.g., "0"), which is set by the control circuit 11. The rising edge r1 of data signal da1 may be referred as a "first rising edge" of data signal da1 during the enumerating procedure. When entering the enumerating procedure, data signal da1 at input data port SI1 is changed from the low voltage level to the high voltage level at the rising edge r1. The rising edge r1 of data signal da1 may be referred as a "first rising edge". After the rising edge r1, control circuit 11 detects further rising edges of data signal da1. When a subsequent rising edge r2 after rising edge r1 is detected by control circuit 11, registered value of "LUN ID" of logic unit 101 is incremented by "1" (i.e., incremented from "0" to become "1"). The rising edge r2 may be referred to as a "second rising edge" of data signal da1, with respect to the first rising edge r1.

Still, control circuit 11 continues to detect further rising edges. When a first period ET (starting from the rising edge r2) expires and control circuit 11 does not detect any further rising edges (other than rising edges r1 and r2), the registered value of identifier "LUN ID" of logic unit 101 has a final value determined as "1". In other words, rising edge r2 may also be referred to as "last rising edge" detected by control circuit 11, the "last rising edge" of the pulses of the data signal da1 is one of the rising edges of the pulses which is last detected by control circuit 11. The registered value of identifier "LUN ID" of logic unit 101 has a determined final value, when first period ET starting from the last rising edge r2 expires (i.e., the final value of the identifier "LUN ID" is determined when first period ET expires).

Then, control circuit 11 controls logic unit 101 to generate data signal da2 as a sequence of M pulses, with the count number M equal to the final value of identifier "LUN ID" of logic unit 101 added by "2". In the example of FIG. 4, final value of identifier "LUN ID" of logic unit 101 is "1", hence logic unit 101 to generate data signal da2 as three pulses p2(1), p2(2) and p2(3).

Similarly, the pulses p2(1), p2(2) and p2(3) are received by logic unit 102 of next stage at its input data port SI2, and control circuit 12 of logic unit 102 detects rising edges r1-r3 of pulses p2(1)-p2(3) to enumerate "LUN ID" of logic unit 102. When the rising edge r1 (i.e., the first rising edge) is detected, the registered value of "LUN ID" of logic unit 102 obtains an initial value (e.g., "0"). Then, when rising edge r2 (i.e., the second rising edge) and rising edge r3 (i.e., the third rising edge) are detected, the registered value of "LUN ID" of logic unit 102 is incremented by "1" for each of rising edges r2 and r3. That is, registered value of "LUN ID" of logic unit 102 becomes "2". Then, if first period ET (starting from the rising edge r3) expires and control circuit 12 does not detect any further rising edges (other than rising edges r1-r3), the registered value of identifier "LUN ID" of logic unit 102 has a final value determined as "2". In other words, rising edge r3 may also be referred to as "last rising edge" detected by control circuit 12, and registered value of identifier "LUN ID" of logic unit 102 has a final value of "2", which is determined when first period ET starting from the last rising edge r3 expires. Then, control circuit 12 controls logic unit 102 to generate data signal da3 as four pulses p3(1)-p3(4), with the count number M equal to "4".

In the example of FIGS. 3 and 4, when control circuit of the i-th logic unit detects subsequent rising edges r2, r3, r4 . . . etc. after the first rising edge r1, registered value of "LUN ID" is incremented by "1". Furthermore, the i-th logic unit generates M pulses (where M equal to final value plus "2") to (i+1)-th logic unit of next stage. Therefore, final value of "LUN ID" of the i-th logic unit is determined as "(i-1)", as equation (2). Such as, the first logic unit (i.e., logic unit 100) has "LUN ID" with final value of "0", the second logic unit (i.e., logic unit 101) has "LUN ID" with final value of "1", and the third logic unit (i.e., logic unit 102) has "LUN ID" with final value of "2".

$$\text{final value of } LUN\ ID = (i-1) \tag{2}$$

In another example, when control circuit of the i-th logic unit detects subsequent rising edges after the first rising edge, registered value of "LUN ID" may increase by an increment "K1" (where K1 is an positive integer such as 1, 2, 3, 4 . . . etc.) Correspondingly, the i-th logic unit may generate M pulses with M equal to final value plus "(2×K1)". In this manner, final value of "LUN ID" of the i-th logic unit may be determined as "(i×K1-1)", as equation (3). Such as, when K1 is equal to "2", the first logic unit (i.e., logic unit 100) has "LUN ID" with final value of "1", the second logic unit (i.e., logic unit 101) has "LUN ID" with final value of "3", and the third logic unit (i.e., logic unit 102) has "LUN ID" with final value of "5".

$$\text{final value of } LUN\ ID = (i \times K1 - 1) \tag{3}$$

The pulses generated by the N-th logic unit (i.e., the logic unit of the last stage in the chain) may be received by the host controller 300 through the input data port MISO. The host controller 300 may determine the total number N of the logic units (for example, total number "3" of the logic units 100-102) according to the pulses generated by the N-th logic unit. In one example, the host controller 300 may determine the total number N of the logic units according to the count number M of the pulses generated by the N-th logic unit. Such as, the host controller 300 receives four pulses p3(1)-p3(4) from the N-th logic unit, and the host controller 300 may analyze the count number M (i.e., equal to "4") of the four pulses p3(1)-p3(4), and then determine the total number N of the logic units as the count number M minus one (i.e., N=M-1).

In the above example shown in FIG. 4, the identifier "LUN ID" of the i-th logic unit is enumerated according to the rising edges of data signal da0-da3. In other examples (not shown), the identifier "LUN ID" may be enumerated according to the falling edges of data signal da0-da3. For example, in response to the detection of fall edge f1 (not shown) of data signal da1, a registered value of identifier "LUN ID" of logic unit 101 obtains an initial value of "0". Then, when a subsequent falling edge f2 after the falling edge f1 is detected by control circuit 11, registered value of "LUN ID" of logic unit 101 is incremented by "1", such that registered value becomes "1". Then, when the first period ET after the falling edge f2 expires and control circuit 11 does not detect any further falling edges (other than falling edge f2), the registered value of identifier "LUN ID" of logic unit 101 has a determined final value. Similar schemes may be utilized by the logic unit 102. Such as, when the control circuit 12 of logic unit 102 detects fall edge f1 of data signal da2, a registered value of identifier "LUN ID" of logic unit 102 obtains an initial value of "0". When the control circuit 12 detects a next fall edge f2 of data signal da2, registered value of identifier "LUN ID" of logic unit 102 is incremented by "1" to form "1", and registered value of identifier "LUN ID" of logic unit 102 is further incremented as "2" when a next falling edge f3 is detected. Then, when the first period ET after the falling edge f3 expires and no any further falling edges are detected, the registered value of identifier "LUN ID" of logic unit 102 has a determined final value.

Figure 5:
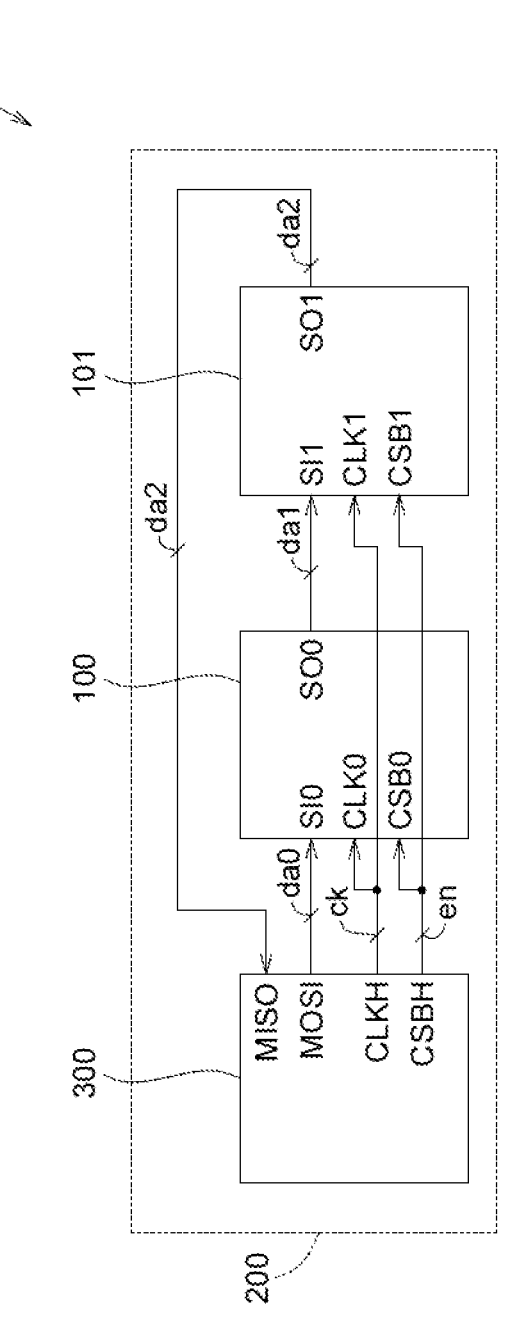
FIG. 5 is a block diagram of the memory system illustrating an exemplary enumerating procedure for the identifier "LUN ID" of the logic units.

FIG. 5 is a block diagram of the memory system 1000 illustrating an exemplary enumerating procedure for the identifier "LUN ID" of the logic units 100 and 101. FIG. 5 shows two logic units 100 and 101 as an example, but the total number of logic units is not limited as "2".

Unlike the example of FIG. 3A, the exemplary memory system 1000 of FIG. 5 may utilize input data ports SI0 and SI1, output data ports SO0 and SO1, clock ports CLK0 and CLK2 and enable ports CSB0 and CSB1 of logic units 100 and 101 in the sideband bus 200. Furthermore, the host controller 300 is utilized, with its output data port MOSI coupled to the input data port SI0 of logic unit 100 and its input data port MISO coupled to the output data port SO2 of logic unit 102. Host controller 300 provides data signal da0 to logic unit 100 and receives data signal da2 from logic unit 101. Furthermore, host controller 300 provides enable signal en at enable port CSBH and transmits enable signal en to logic units 100 and 101. Moreover, host controller 300 provides clock signal ck at clock port CLKH and transmits clock signal ck to logic units 100 and 101.

Furthermore, memory system 1000 may further include another control circuit (which is not shown in FIG. 5) other than control circuits 10-12 as shown in FIG. 1A respective disposed in logic units 100 and 101. Such a control circuit may record final values of the enumerated identifiers "LUN ID" of logic units 100 and 101. In another example, the host controller 300 may further include a register or a storage element (not shown in FIG. 5) to record final values of the enumerated identifiers "LUN ID" of logic units 100-102.

Figure 6:
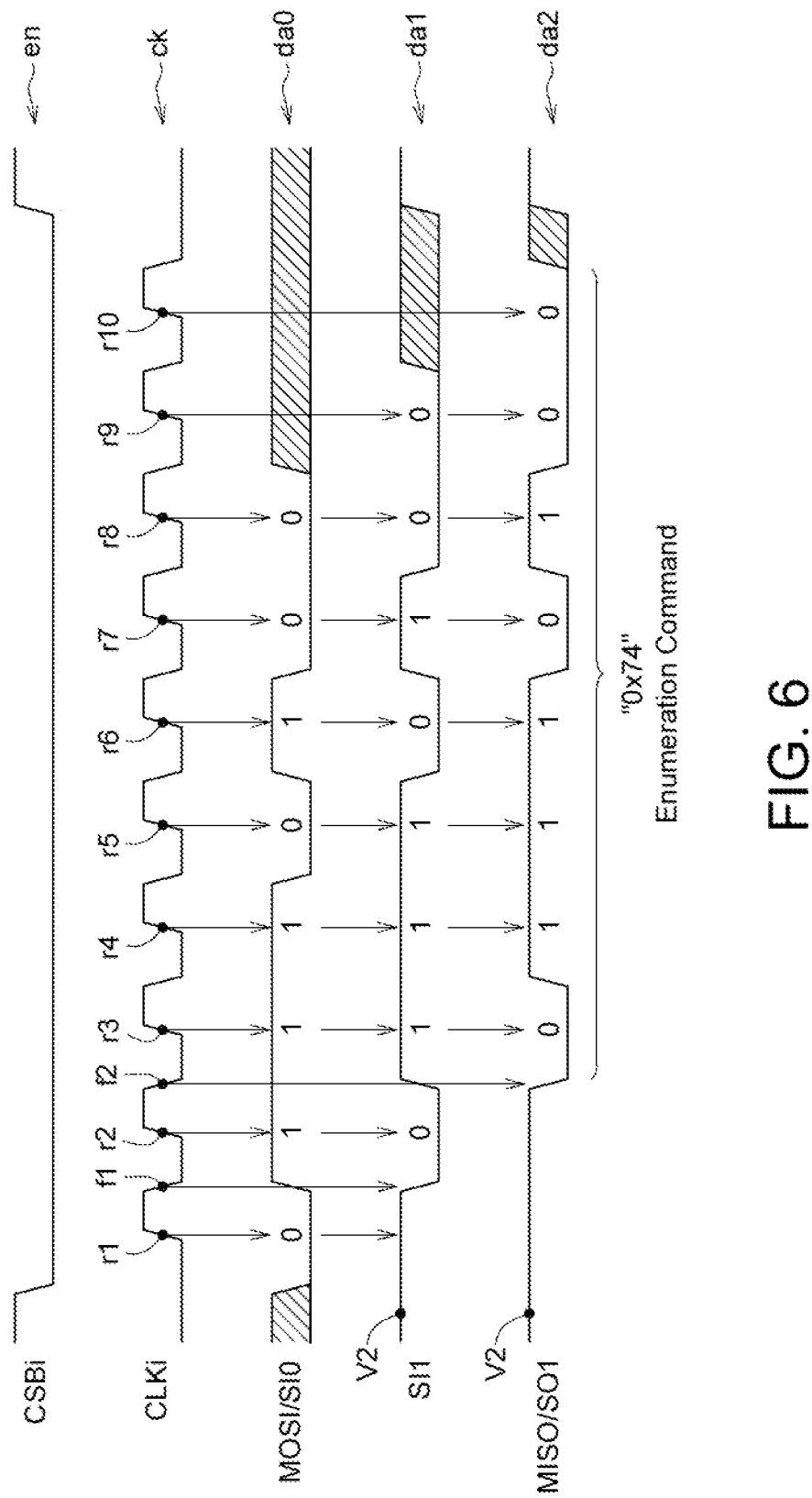
FIG. 6 is an exemplary waveform diagram of enable signal, clock signal and data signals of logic units of FIG. 5.

FIG. 6 is an exemplary waveform diagram of enable signal en, clock signal ck and data signals da0-da2 of logic units 100 and 101 of FIG. 5, illustrating another enumerating procedure for the identifiers "LUN ID" of logic units 100 and 101. Referring to both FIGS. 5 and 6, before the enumerating procedure for the identifier "LUN ID", during or after a power-on cycle of the memory system 1000 in which the host controller 300 and logic units 100 and 101 are powered-ON, or, during or after a reset cycle of the memory system 1000 for which the host controller 300 and logic units 100 and 101 are reset, the registered value of "LUN ID" of each of logic units 100 and 101 obtains an initial value (e.g., "0"). Furthermore, in an idle state after the power-on cycle or the reset cycle, the output data ports SO0 and SO1 are initially driven as a voltage V2. The voltage V2 may represent the idle state, and the voltage V2 may indicate a logic value opposite to the logic value of the "start bit" of the first command carried by the data signal da0, as will be discussed in later paragraphs.

When entering the enumerating procedure for identifier "LUN ID", enable signal en changes to the low voltage level, and enable ports CSB0 and CSB1 of logic units 100 and 101 are asserted, hence logic units 100 and 101 are activated to operate the sideband bus 200. After enable signal en changes to the low voltage level, clock signal ck starts to toggle with a sequence of clock cycles with respective rising edges and falling edges. Such as, clock signal ck has a rising edge r1 and a falling edge f1 in the first clock cycle. Rising edge r1 may be referred as a "first rising edge" of clock signal ck during the enumerating procedure, such as, a "first rising edge" after enable signal en changes to the low voltage level (i.e., after enable ports CSB0 and CSB1 are asserted and logic units 100 and 101 are activated to operate the sideband bus 200). Falling edge f1 may be referred as a "first falling edge" of clock signal ck, after enable signal en changes to the low voltage level. Furthermore, clock signal ck has subsequent rising edges r2, . . . r8, r9 and r10 after the first rising edge r1.

In the beginning of the enumerating procedure for identifier "LUN ID", after enable signal en changes to the low voltage level, host controller 300 transmits data signal da0 to logic unit 100 at input data port SI0, and data signal da0 carries a first command of SPI protocol. The first command has totally 8 bits including 1 bit of "start bit" and 7 bits of op-code, and the last bit of the op-code refers to an "end bit". The "start bit" of the first command has a logic value which may be "1" (i.e., corresponding to high voltage level) or "C" (i.e., corresponding to low voltage level), and the logic value of the "start bit" may be opposite to the logic value of an "idle state" of the sideband bus. When the "idle state" has a logic value of "1" (i.e., the "idle state" is represented by logic "1"), the "start bit" has a logic value of "C". On the other hand, when the "idle state" has a logic value of "C", the "start bit" has a logic value of "1". In the example of FIG. 6, the first command may be an "Enumeration Command" with binary bits of "01110100" representing a hex number of "0×74", with the start bit of "C" and the end bit of "C".

In the idle state, the output data ports SO0 and SO1 are initially driven as the voltage V2, and the voltage V2 represents a logic value opposite to the logic value of the "start bit" of the first command. In the example of FIG. 6, the "start bit" of the first command has a logic value "C", and the voltage V2 has a high voltage level representing a logic value "1" opposite to the "start bit".

The control circuit 10 (not shown in FIG. 5) of logic unit 100 detects rising edges and falling edges of clock signal ck. When control circuit 10 detects the first rising edge r1, control circuit 10 controls logic unit 100 to latch data signal da0 at input data port SI0, and the start bit of the first command is acquired by logic unit 100. Since the start bit is acquired, identifier "LUN ID" of logic unit 100 keeps its registered value unchanged (i.e., keeps the registered value as the initial value "C" which is set during the power-on cycle or the reset cycle of memory system 1000).

On the other hand, when control circuit 11 (not shown in FIG. 5) of logic unit 101 of next stage detects the first rising edge r1 of clock signal ck, the control circuit 11 of logic unit 101 latches data signal da1 at first rising edge r1 and acquire voltage V2 in data signal da1. That is, at the first rising edge r1, the data signal da1 is latched to acquire voltage V2 indicating the idle state. Therefore, the logic unit 101 knows that, at the first rising edge the data signal sa1 remains at the idle state, and the start bit of the first command has not been acquired. Hence, identifier "LUN ID" of logic unit 101 increments its registered value by "1". In another example, registered value of the identifier "LUN ID" may be incremented by an increment "K2" (where K2 is a positive integer of 2, 3, 4 . . . etc.).

After the rising edge r1, control circuit 10 of logic unit 100 detects a falling edge f1 of clock signal ck, and control circuit 10 controls the logic unit 100 to pass data signal da0 to output data port SO0, forming data signal da1. Data signal da1 is then provided to input data port SI1 of logic unit 101.

After the falling edge f1, control circuit 10 of logic unit 100 detects a rising edge r2 (i.e., the second rising edge) of clock signal ck, and logic unit 100 latches data signal da0 and acquires a second bit "1" of the first command. Furthermore, control circuit 11 of logic unit 101 detects the rising edge r2 of clock signal ck, and logic unit 101 latches data signal da1 and acquires the start bit of the first command (i.e., the start bit has a logic value opposite to that represented by the second voltage V2). Since the start bit has been acquired by logic unit 101 (not the second voltage V2 of the idle state is acquired), identifier "LUN ID" of logic unit 101 keeps its registered value unchanged (i.e., keeps its registered value as "1").

Then, control circuit 10 of logic unit 100 detects a rising edge r3 (i.e., the third rising edge) of clock signal ck, and logic unit 100 latches data signal da0 and acquires a third bit "1" of the first command. Furthermore, control circuit 11 of logic unit 101 detects the rising edge r3 of clock signal ck, and logic unit 101 latches data signal da1 and acquires the second bit "1" of the first command.

Likewise, control circuit 10 of logic unit 100 detects subsequent rising edges r4, r5, r6 and r7 (i.e., the 4-th to the 7-th rising edges) of clock signal ck, and logic unit 100 latches data signal da0 at these rising edges r4, r5, r6 and r7 respectively and acquires a 4-th bit "1", a 5-th bit "0", a 6-th bit "1" and a 7-th bit "0" of the first command.

Then, at a rising edge r8, which is subsequent to the rising edges r4, r5, r6 and r7, logic unit 100 latches data signal da0 to acquire the end bit "0" (i.e., the 8-th bit) of the first command. The end bit of the first command is acquired, and the control circuit 10 of the logic unit 100 checks whether the totally acquired 8 bits, which are latched at rising edges r1-r8 respectively, conform to a predefined command content of the SPI protocol of the sideband bus. When the control circuit 10 of the logic unit 100 verifies that the acquired 8 bits (i.e., the start bit to the end bit) of the first command exactly meet a content "01110100" of the "Enumeration Command", the registered value of the identifier "LUN ID" of logic unit 100 is determined as a final value of "0". On the other hand, when the acquired 8 bits of the first command are verified not to meet the content "01110100" of the "Enumeration Command", the registered value of the identifier "LUN ID" of logic unit 100 is kept unchanged.

Similar schemes may be applied to the logic unit 101. At a rising edge r9 subsequent to the rising edge r8, logic unit 101 latches data signal da1 to acquire the end bit of the first command. When the control circuit 11 of the logic unit 101 verifies that the acquired 8 bits of the first command meet a content "01110100" of "Enumeration Command", the registered value of the identifier "LUN ID" of logic unit 101 is determined as a final value of "1". Otherwise, if not to meet the content "01110100" of the "Enumeration Command", the registered value of the identifier "LUN ID" of logic unit 101 is kept unchanged.

On the other hand, when a falling edge f2 of clock signal ck is detected by control circuit 11 of logic unit 101, control circuit 11 control logic unit 101 to pass data signal da1 to output data port SO1, forming data signal da2. Data signal da2 is then provided to input data port MISO of host controller 300. Then, at a rising edge r10 subsequent to the rising edge r9, host controller 300 latches data signal da2 to acquire the end bit of the first command, and host controller 300 controls to finish the enumerating procedure for identifiers "LUN ID" of logic units 100 and 101. Then, the enable signal en changes to high voltage level, and logic units 100 and 101 are de-activated.

Figure 7:
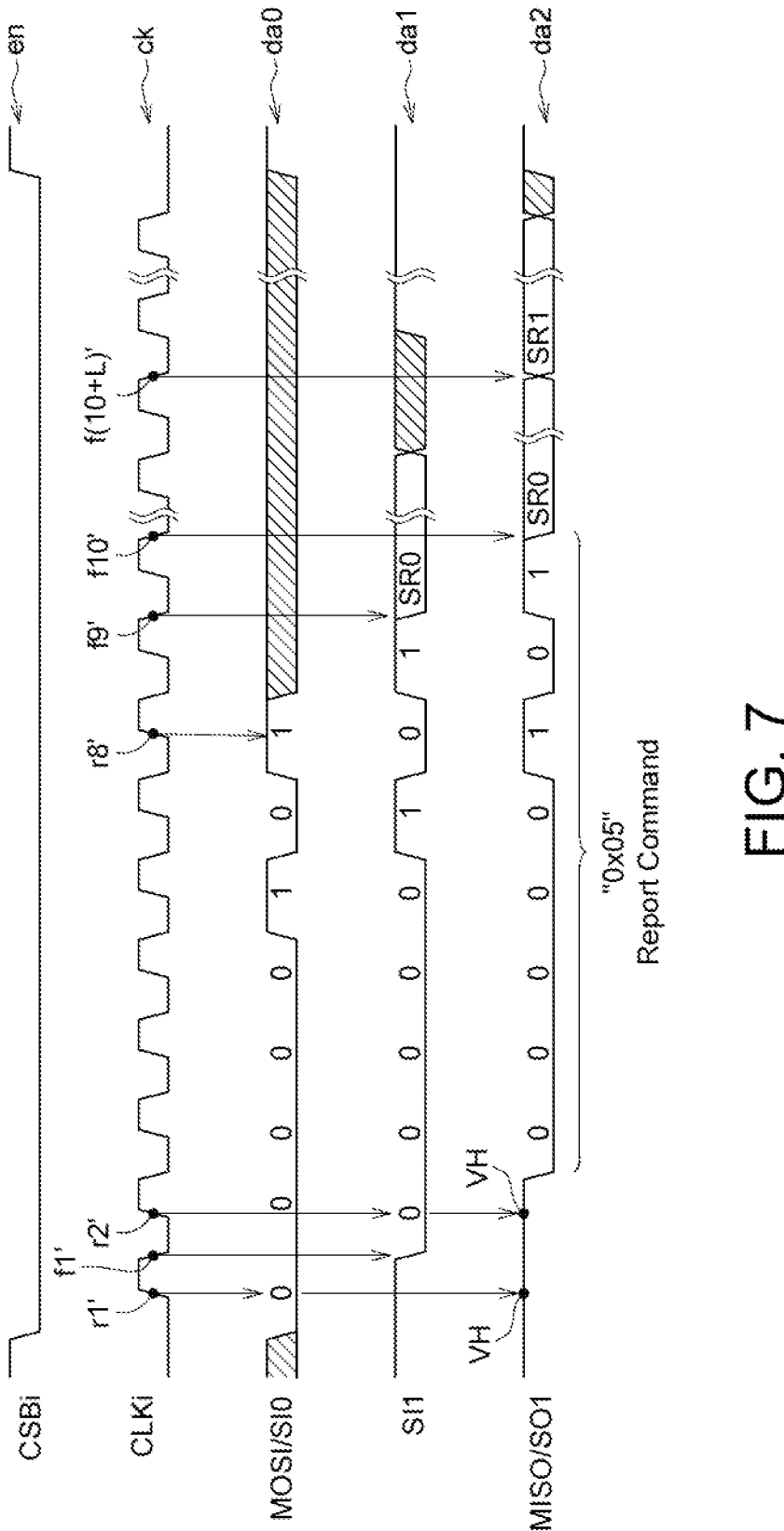
FIG. 7 is another exemplary waveform diagram of enable signal, clock signal and data signals of logic units of FIG. 5.

FIG. 7 is another exemplary waveform diagram of enable signal en, clock signal ck and data signals da0-da2 of logic units 100 and 101 of FIG. 5, illustrating a status-reporting procedure for logic units 100 and 101. The status-reporting procedure of logic units 100 and 101 may be performed after the enumerating procedure for their identifiers "LUN ID". In the example of FIG. 7, data signals da0-da2 may carry a second command to facilitate the status-reporting procedure. The second command is, for example, a "Report Command". The "start bit" of the second command has a predefined logic value L_S which is similar to the "start bit" of the first command. The predefined logic value L_S of the "start bit" of the second command may be opposite to the logic value representing an "idle state" of the sideband bus. On the other hand, the "end bit" of the second command has a predefined logic value L_E may be opposite to predefined logic value L_S of the "start bit". In the example of FIG. 7, the second command (e.g., the "Report Command") has binary bits of "00000101" (i.e., representing a hex number of "0×05") with a start bit of "0" and an end bit of "1".

Before the status-reporting procedure, enable signal en may return to high voltage level. When entering the status-reporting procedure, enable signal en changes to low voltage level, and clock signal ck starts to toggle. At a rising edge r1' (i.e., the "first rising edge" after enable signal en changes to low voltage level), control circuit 10 of logic unit 100 starts to receive the Report Command carried by data signal da0. Then, at a falling edge f1', logic unit 100 drives data signal da0 to output data port SO0, forming data signal da1. Logic unit 101 of next stage may start to receive Report Command carried by data signal da1.

Then, at a rising edge r8' (which is among several subsequent rising edges after the rising edge r2'), logic unit 100 latches data signal da0 to acquire the end bit of Report Command. Therefore, logic unit 100 is ready to output a status data SR0 which indicates a status of logic unit 100. The status data SR0 may have a data length of L bits. Then, at a subsequent falling edge f9' of a next clock cycle with respect to rising edge r8, logic unit 100 starts to transmit the L-bit status data SR0 in data signal da1 through its output data port SO0, regardless data signal da0 at its input data port SI0. Clock cycles of a number L are needed to transmit the L-bit status data SR0 in data signal da1.

The status data SR0 carried by data signal da1 is received by logic unit 101. At a subsequent falling edge f10', the status data SR0 in data signal da1 passes to output data port SO1 of logic unit 101, and control circuit 11 controls logic unit 101 to wait L clock cycles (starting from falling edge f10') to complete transmission of status data SR0. Then, at a falling edge f(10+L)' which lags the falling edge f10' by L clock cycles, logic unit 101 starts to transmit its status data SR1 through its output data port SO1, regardless the data signal da1 at its input data port SI1.

In the above example of status-reporting procedure, logic unit 101 has identifier "LUN ID" of "1", and logic unit 101 may wait (L+2)'s clock cycles for completing transmission of status data SR0, and then transmit its status data SR1. When memory system 1000 includes more logic units, such as logic units 102, 103, . . . etc., logic unit 102 with identifier "LUN ID" of "2" may wait (L+3)'s clock cycles before transmitting its status data SR2, and logic unit 103 with identifier "LUN ID" of "3" may wait (L+4)'s clock cycles before transmitting its status data SR3. That is, the (i+1)-th logic unit with identifier "LUN ID" of "i" may wait (i+L+1) clock cycles before transmitting its status data SR(i).

On the other hand, at the first rising edge (i.e., rising edge r1') and the second rising edge (i.e., rising edge r2') after enable signal en changes to low voltage level, host controller 300 latches data signal da2 having voltage VH at its data port MISO. Since host controller 300 latches voltage VH at two rising edges r1' and r2', host controller 300 may recognize that logic units of total number "2" (i.e., two logic units 100 and 101) exist in memory system 1000.

Figure 8:
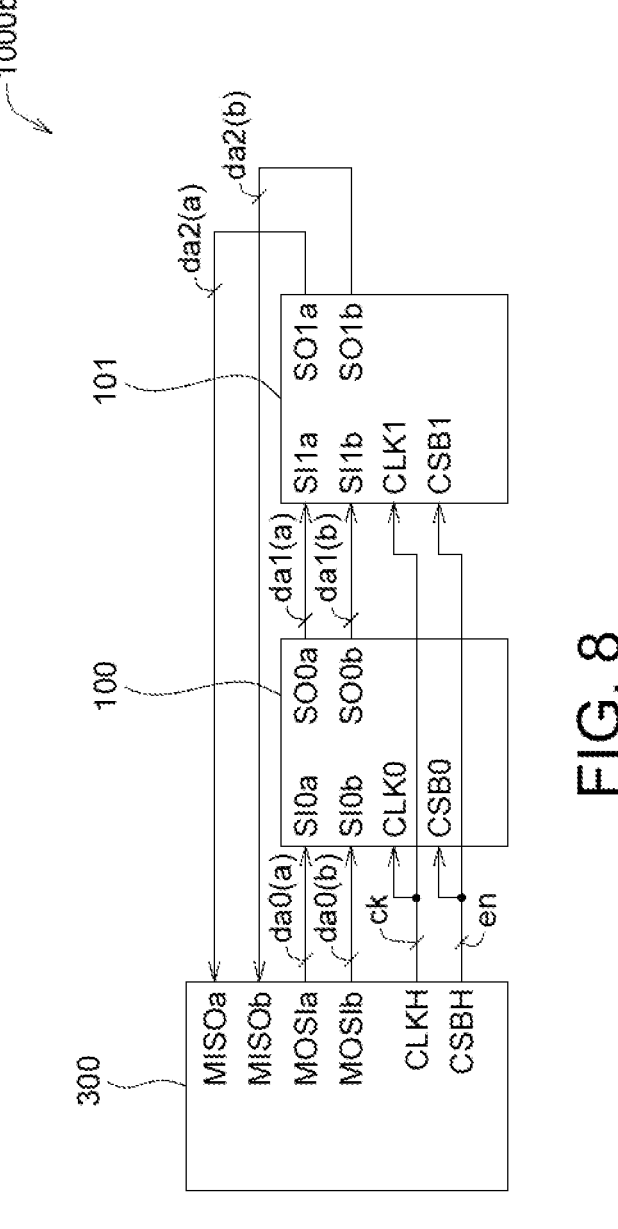
FIG. 8 is a block diagram of memory system according to another example of the disclosure.

FIG. 8 is a block diagram of memory system 1000b according to another example of the disclosure. The memory system 1000b of FIG. 8 is similar to the memory system 1000 of FIG. 5 except that, each of logic units 100 and 101 has two data paths operating with two input data ports and two output data ports. More particularly, the logic unit 100 has two input data ports SI0a and SI0b and two output data ports SO0a and SO0b. The logic unit 101 has two input data ports SI1a and SI1b and two output data ports SO1a and SO1b. Furthermore, host controller 300 has two input data ports MISOa and MISOb and two output data ports MOSIa and MOSIb.

To operate one of the two data paths of memory system 1000b, host controller 300 transmits data signal da0(a) through output data port MOSIa, data signal da0(a) is provided to logic unit 100 at input data port SI0a. Then, logic unit 100 transmits data signal da1(a) through output data port SO0a, data signal da1(a) is provided to logic unit 101 at input data port SI11a. Then, logic unit 101 transmits data signal da2(a) through output data port SO1a, data signal da2(a) is provided to host controller 300 at input data port MISOa.

To operate the other one of the two data paths of memory system 1000b, host controller 300 transmits data signal da0(b) through output data port MOSIb, data signal da0(b) is provided to logic unit 100 at input data port SI0b. Then, logic unit 100 transmits data signal da1(b) through output data port SO0b, data signal da1(b) is provided to logic unit 101 at input data port SI11b. Then, logic unit 101 transmits data signal da2(b) through output data port SO1b, data signal da2(b) is provided to host controller 300 at input data port MISOb.

Figure 9:
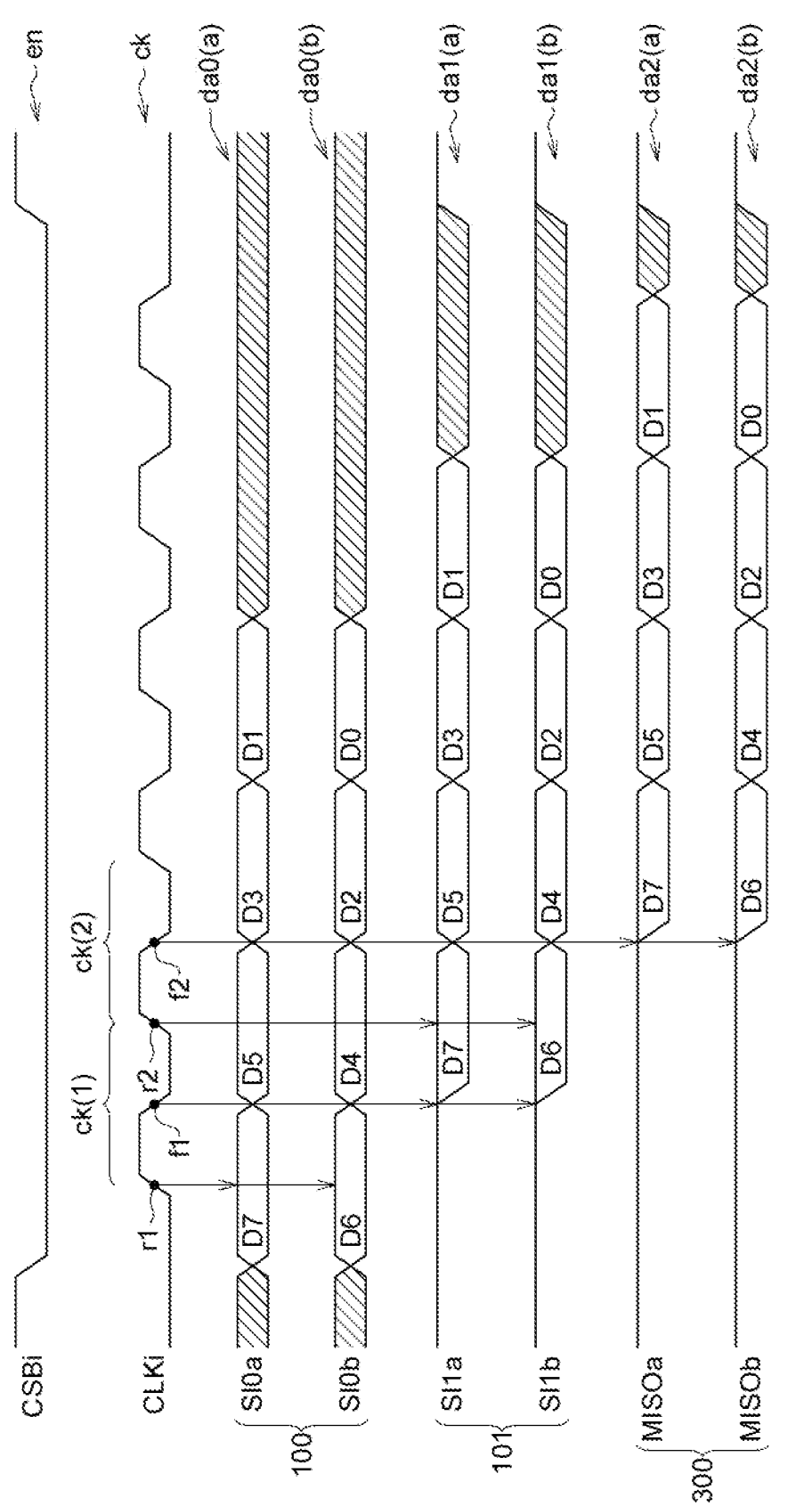
FIG. 9 is an exemplary waveform diagram of enable signal, clock signal, data signals and data signals of logic units of FIG. 8.

FIG. 9 is an exemplary waveform diagram of enable signal en, clock signal ck, data signals da0(*a*)-da2(*a*) and data signals da0(*b*)-da2(*b*) of logic units 100 and 101 of FIG. 8. Referring to FIG. 8, when enable signal en changes to low voltage level, enable port CSB0 and CSB1 of logic unit 100 and 101 are asserted and logic units 100 and 101 are activated. Input data ports SI0*a* and SI0*b* of logic unit 100 are provided with data signals da0(*a*) and da0(*b*) which carry contents D7 and D6.

At a rising edge r1 of clock cycle ck(1) of clock signal ck, control circuit 10 (not shown in FIG. 8) of logic unit 100 controls to latch data signal da0(*a*) and da0(*b*) at input data ports SI0(*a*) and SI0(*b*), acquiring contents D7 and D6. Then, at a falling edge f1 of the same clock cycle ck(1), control circuit 10 controls to transmit data signals da1(*a*) and da1(*b*) which carry contents D7 and D6, to be provided to input data ports SI1(*a*) and SI1(*b*) of logic unit 101.

Similarly, at a rising edge r2 of clock cycle ck(2) of clock signal ck, control circuit 11 (not shown in FIG. 8) of logic unit 101 controls to latch data signal da1(*a*) and da1(*b*) at input data ports SI1(*a*) and SI1(*b*), acquiring contents D7 and D6. Then, at a falling edge f2 of the same clock cycle ck(2), control circuit 11 controls to transmit data signals da2(*a*) and da2(*b*) which carry contents D7 and D6, to be provided to input data ports MISO(a) and MISO(b) of host controller 300.

In the examples of FIGS. 8 and 9, the i-th logic unit has two data paths operating with two input data ports SI(i-1)(a) and SI(i-1)(b) and two output data ports SO(i-1)(a) and SO(i-1)(b). Therefore, transmission bandwidth are enhanced by two times, hence processing time of enumerating procedure for "LUN ID" may be reduced. Such as, only half the clock cycles are needed for enumerating "LUN ID".

Figure 10:
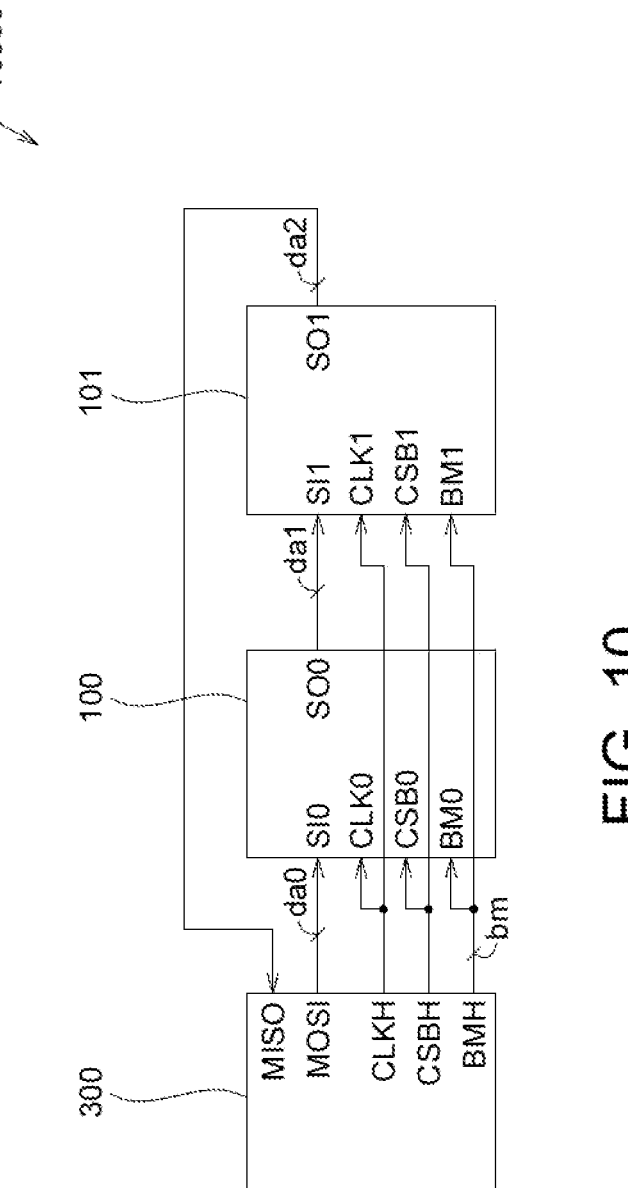
FIG. 10 is a block diagram of memory system according to still another example of the disclosure.

FIG. 10 is a block diagram of memory system 1000*c* according to still another example of the disclosure. The memory system 1000*c* of FIG. 10 is similar to the memory system 1000 of FIG. 5 except that, the logic units 100 and 101 selectively operate in a blocking mode or a non-blocking mode of the sideband bus. Referring to FIG. 10, the logic units 100 and 101 have control ports BM0 and BM1, and host controller 300 has a corresponding control port BMH coupled to control ports BM0 and BM1, which transmits a control signal bm.

The control signal bm is used to control logic units 100 and 101 selectively operate in the blocking mode or the non-blocking mode. When the control signal bm has a high voltage level, logic units 100 and 101 operate in the blocking mode, and data signal da0 at input data port SI0 is delayed by a period and then passed to the output data port SO0. On the other hand, when the control signal bm has a low voltage level, logic units 100 and 101 operate in the non-blocking mode, and data signal da0 at input data port SI0 is directly passed to the output data port SO0.

Figure 11A:
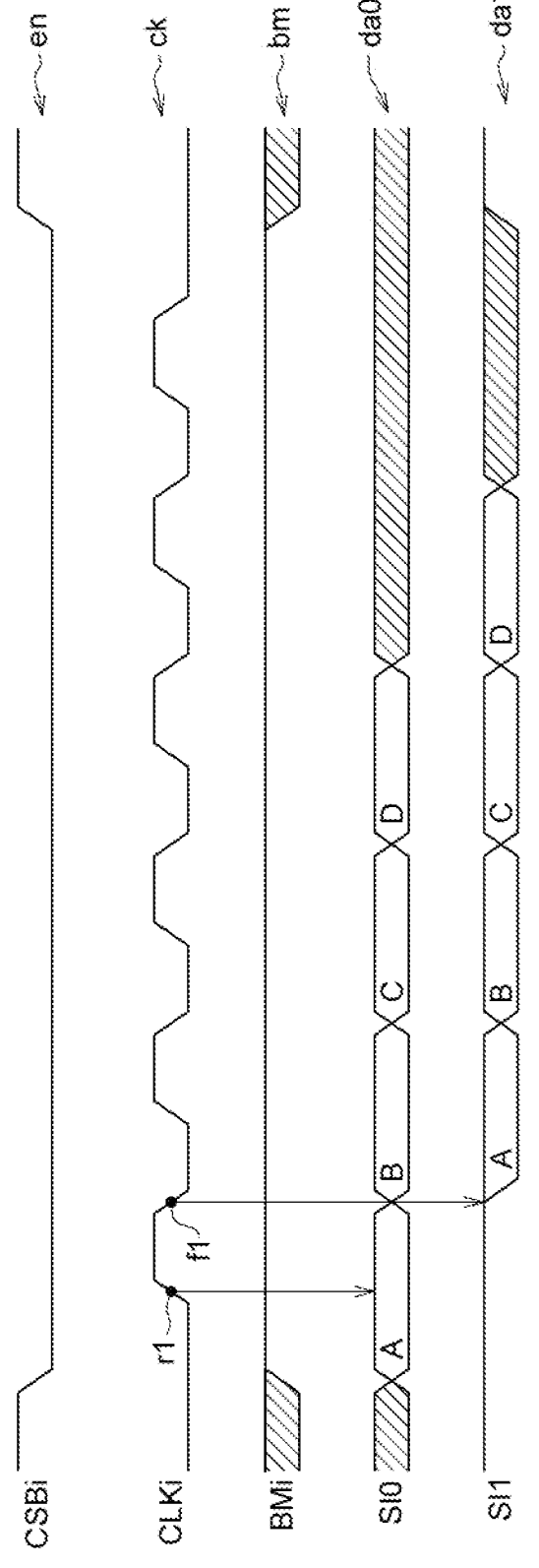
FIGS. 11A and 11B are exemplary waveform diagrams of enable signal, clock signal, control signal and data signals of logic units of FIG. 10.
Figure 11B:
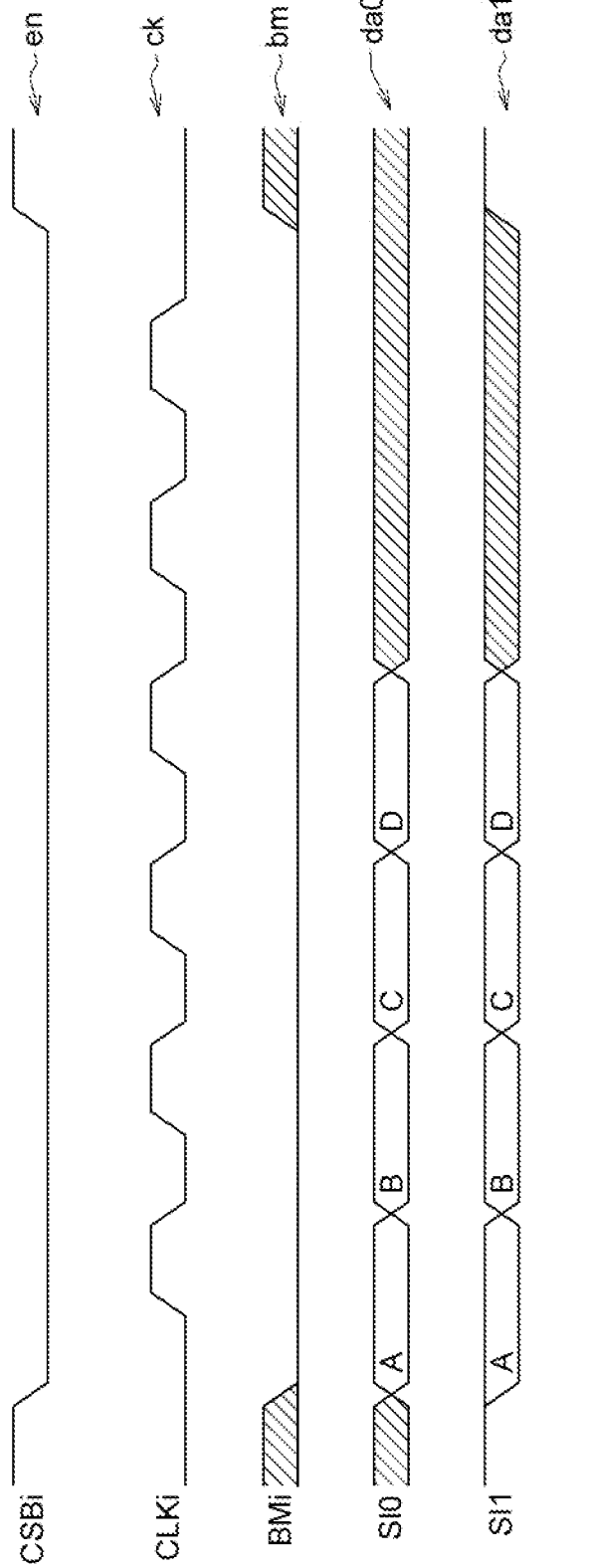

FIGS. 11A and 11B are exemplary waveform diagrams of enable signal en, clock signal ck, control signal bm and data signals da0 and da1 of logic units 100 and 101 of FIG. 10. First, referring to FIG. 11A, the control signal bm has a high voltage level, hence logic units 100 and 101 operate in the blocking mode. At a rising edge r1 of clock signal ck, the content "A" carried by data signal da0 at input data port SI0 is latched by logic unit 100. Then, data signal da0 is delayed by a half of a clock cycle. At a falling edge f1 of clock signal ck, data signal da1 carrying the content "A", is driven at output data port SO0 of logic unit 100. Data signal da1 is received at input data port SI1 of logic unit 101. In the blocking mode, data signal da1 lags data signal da0 by one clock cycle.

On the other hand, referring to FIG. 11B, the control signal bm has a low voltage level, hence logic units 100 and 101 operate in the non-blocking mode. The content "A" carried by data signal da0 is received at input data port SI0 by logic unit 100. Simultaneously, data signal da0 is directly passed to output data port SO0 of logic unit 100 to form data signal da1. Data signal da1 carrying content "A" is provided to input data port SI1 of logic unit 101. In the non-blocking mode, data signal da1 does not lag data signal da0.

Figure 12A:
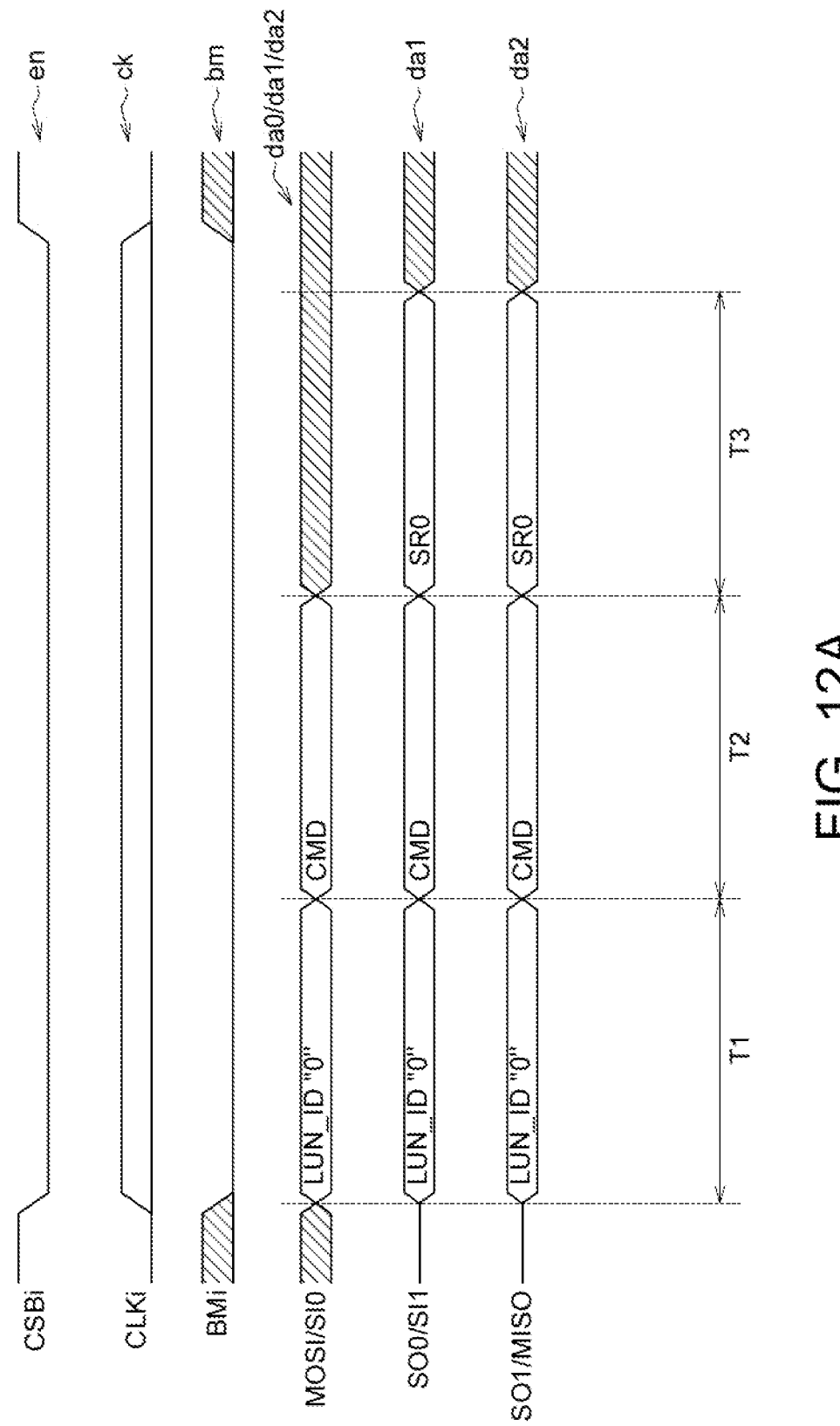
FIGS. 12A and 12B are other exemplary waveform diagrams of enable signal, clock signal, control signal and data signals of logic units of FIG. 10.
Figure 12B:
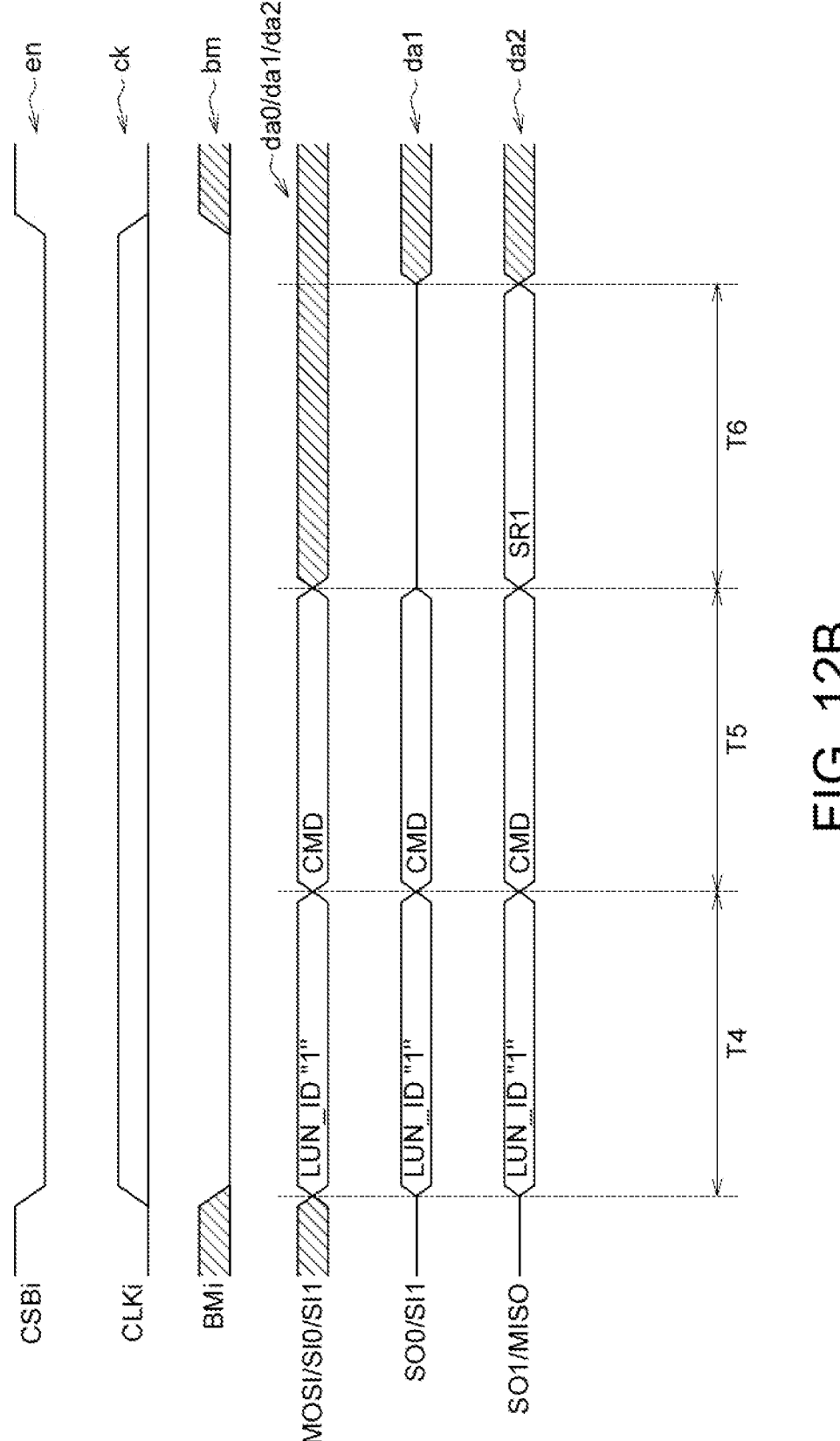

FIGS. 12A and 12B are other exemplary waveform diagrams of enable signal en, clock signal ck, control signal bm and data signals da0-da2 of logic units 100 and 101 of FIG. 10, to illustrate status-reporting of logic units 100 and 101 in the non-blocking mode. Given that enumerating procedure for identifiers "LUN ID" of logic units 100 and 101 is completed, and logic units 100 and 101 have been assigned with final value of their identifier "LUN ID". Such as, logic unit 100 is assigned with final value "0" of identifier "LUN ID", and logic unit 101 is assigned with final value "1" of identifier "LUN ID".

First, referring to FIG. 12A, during a period T1, final value "0" of identifier "LUN ID" of logic unit 100 is carried by data signals da0-da2, which are received at input data ports SI0, SI1 and MISO of logic units 100 and 101 and host controller 300. The final value "0" of identifier "LUN ID" indicates that, only the logic unit 100 with "LUN ID" of "0" is specified, while other logic units than logic unit 100 are not specified.

Then, during a period T2, data signals da0-da2 carry a command and are transmitted at input data ports SI0, SI1 and MISOI. For example, the command is "Report Command" having binary bits of "00000101" which represents a hex number of "0×05". The "Report Command" indicates that, a status of the logic unit 100, which is specified by "LUN ID" of "C", will be reported to the host controller 300. In this example, only the status of the specified logic unit 100 is reported to the host controller 300.

Then, during a period T3, a status data SR0 which indicates the status of the specified logic unit 100, is provided in each of data signals da1-da2 in the non-blocking mode. The status data SR0 carried by the data signal da2 is received by the host controller 300 through the input data port MISO.

Then, referring to FIG. 12B, during a period T4 which is subsequent to the period T3, final value "1" of identifier "LUN ID" of logic unit 101 is carried by data signals da0-da2, which are simultaneously received at input data ports SI0, SI1 and MISOI of logic units 100 and 101 and host controller 300. Then, during a period T5, data signals da0-da2 carry a "Report Command" and are transmitted at input data ports SI0, SI1 and MISO. Then, during a period T6, output data port SO0 of logic unit 100 is tri-stated. Furthermore, a status data SR1 which indicates the status of logic unit 101 is provided in the data signal da2 in the non-blocking mode.

According to aforementioned various examples of the disclosure, identifiers "LUN ID" of logic units are enumerated utilizing sideband bus 200, therefore port connections and wire bounding of logic units may be simplified, and memory system may achieve a lower cost. The identifier "LUN ID" may be dynamically enumerated and assigned during the power-on cycle or the reset cycle of logic units. The enumerating schemes for the identifier "LUN ID" utilizing the sideband bus 200, may be applied to a memory unit 150 of a NAND flash type or a NOR flash type.

The sideband bus 200 may be executed with a protocol conformed to the UART or the USB, and the sideband bus 200 may have a higher operating frequency (e.g., up to 250 MHz), enumerating procedure for identifier "LUN ID" may be executed faster. Moreover, the status of each of logic units may be reported utilizing the sideband bus 200, hence the main memory bus (i.e., the ONFI bus 250) will not be occupied.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A memory system, comprising:
a plurality of logic units connected with one another in series to form a chain, each of the logic units has an identifier, an input data port and an output data port, and each of the logic units comprising:
a control circuit, used to control a corresponding one of the logic units to receive a first data signal through the input data port, and transmit a second data signal through the output data port, and the output data port of the corresponding one of the logic units is coupled to the input data port of an adjacent one of the logic units, wherein each of the first data signal and the second data signal has a sequence of states, and the identifier of each of the logic units is enumerated according to a count number of a plurality of state transition edges of the states.

2. The memory system according to claim 1, wherein the chain has a type of Daisy Chain.

3. The memory system according to claim 1, wherein the output data port of the corresponding logic unit is coupled to a host controller to indicate that the corresponding logic unit is the last stage of the chain.

4. The memory system according to claim 3, wherein the host controller is configured to determine the total number of the logic units according to the state transition edges of the second data signal.

5. The memory system according to claim 3, further comprising:
an aux controller, configured to provide the first data signal to the input data port of a first logic unit, and receive the second data signal from the output data port of a last logic unit to determine the total number of the logic units.

6. The memory system according to claim 5, wherein the logic units are accessed by the host controller through the aux controller.

7. The memory system according to claim 1, wherein the output data port of the corresponding logic unit is tied to a first voltage to indicate that the corresponding logic unit is the last stage of the chain.

8. The memory system according to claim 1, wherein the input data port of the corresponding logic unit is tied to a first voltage to indicate that the corresponding logic unit is the first stage of the chain.

9. The memory system according to claim 1, wherein the input data port of the corresponding logic unit is unconnected externally and kept to a first voltage by an internal on-die weak connection to indicate that the corresponding logic unit is the first stage of the chain.

10. The memory system according to claim 1, wherein the input data port and the output data port of each of the logic units are operated with a sideband bus to enumerate the identifier, and the sideband bus is different from a main memory bus of the memory system.

11. The memory system according to claim 1, wherein the identifier is stored in a register and has a registered value, when a first state transition edge is detected, the registered value is an initial value, wherein each of the state transition edges is a rising edge or a falling edge.

12. The memory system according to claim 11, wherein when a subsequent state transition edge is detected, the registered value of the identifier is incremented.

13. The memory system according to claim 12, wherein when a last state transition edge is detected and a first period expires, the registered value of the identifier is determined as a final value according to the count number of the state transition edges, wherein the first period starts from the last state transition edge, and the first period is longer than two times of a duration of each of the states.

14. A memory system, comprising:
a plurality of logic units connected with one another in series to form a chain, each of the logic units has an identifier, an input data port, an output data port and a clock port, and each of the logic units comprising:
a control circuit, used to control a corresponding one of the logic units to receive a first data signal through the input data port and transmit a second data signal through the output data port, and receive a clock signal having a sequence of edges through the clock port, and the output data port of the corresponding one of the logic units is coupled to the input data port of an adjacent one of the logic units,
wherein the corresponding one of the logic units transmits the second data signal carrying a first command, and the adjacent one of the logic units receives the second data signal, and the identifier of each of the logic units is enumerated according to the first command.

15. The memory system according to claim 14, wherein the chain has a type of Daisy Chain.

16. The memory system according to claim 14, wherein the input data port and the output data port of each of the logic units are operated with a sideband bus to enumerate the identifier, and the sideband bus is different from a main memory bus of the memory system.

17. The memory system according to claim 16, wherein the first command is an "Enumeration Command" of a SPI (Serial Peripheral Interface) protocol of the sideband bus, and the first command comprises a start bit and an end bit, wherein each of the edges of the clock signal is a rising edge or a falling edge.

18. The memory system according to claim 17, wherein the identifier is stored in a register and has a registered value, and the registered value is an initial value after a power-on cycle or reset.

19. The memory system according to claim 18, wherein when a first edge of the clock signal of the corresponding one of the logic units and the start bit of the first command are detected, the registered value of the identifier is kept unchanged, when an idle state which leading the start bit in the first data signal of the corresponding one of the logic units is detected at the first edge of the clock signal, the registered value of of the identifier is incremented.

20. The memory system according to claim 19, wherein when the start bit to the end bit of the first command are verified to meet a content of the "Enumeration Command", the registered value of the identifier is determined as a final value, when the start bit to the end bit of the first command are verified not to meet a content of the "Enumeration Command", the registered value of the identifier is kept unchanged.

21. The memory system according to claim 20, wherein the identifier of each of the logic units is enumerated after the power-on cycle or reset, and the final value of each of the logic units is kept unchanged until next power-on cycle or reset.

22. The memory system according to claim 14, wherein the second data signal further carries a second command having a start bit and an end bit, and a status data of the corresponding one of the logic units is reported according to the start bit and the end bit of the second command and the clock signal.

23. The memory system according to claim 22, wherein when the end bit of the second command is detected at one of the edges of the clock signal of the corresponding one of the logic units, the status data is transmitted through the second data signal.

24. The memory system according to claim 23, further comprising:

a host controller, coupled to a first logic unit and the last logic unit of the logic units, wherein when the logic units operate in a non-blocking mode, the status data of the corresponding one of the logic units is transmitted to the host controller.

25. The memory system according to claim 24, wherein when the logic units operate in the non-blocking mode, one of the logic units is specified by the final value of the identifier, and the status data of the specified logic unit is carried in the second data signal and reported to the host controller.

\* \* \* \* \*